United States Patent
Imai

(10) Patent No.: US 9,191,306 B2
(45) Date of Patent: Nov. 17, 2015

(54) NETWORK DESIGN SYSTEM

(75) Inventor: Satoshi Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 501 days.

(21) Appl. No.: 13/307,629

(22) Filed: Nov. 30, 2011

(65) Prior Publication Data

US 2012/0213081 A1 Aug. 23, 2012

(30) Foreign Application Priority Data

Feb. 21, 2011 (JP) ................................. 2011-035010

(51) Int. Cl.
*H04L 12/26* (2006.01)
*H04L 12/721* (2013.01)
*H04L 12/24* (2006.01)

(52) U.S. Cl.
CPC .......... *H04L 45/123* (2013.01); *H04L 41/0806* (2013.01); *H04L 41/145* (2013.01)

(58) Field of Classification Search
None
See application file for complete search history.

(56) References Cited

U.S. PATENT DOCUMENTS

| 5,734,640 | A | * | 3/1998 | Johnson | 370/228 |
| 2008/0080554 | A1 | * | 4/2008 | Hashiguchi et al. | 370/468 |

FOREIGN PATENT DOCUMENTS

| JP | 04-246954 | | 9/1992 |
| JP | 06-052146 | | 2/1994 |
| JP | 10-207934 | | 8/1998 |
| JP | 10-229393 | A | 8/1998 |
| JP | 11-039371 | A | 2/1999 |
| JP | 3090196 | | 9/2000 |
| JP | 2001-069043 | A | 3/2001 |
| JP | 2009-296211 | A | 12/2009 |
| WO | 2004-088921 | A1 | 10/2004 |

OTHER PUBLICATIONS

Kanie, Koichi et al., "Quasi-Dynamic Multi-Layered Photonic Network Design Considering Different Service Holding Times", IEICE Technical Report, PN2006-18 2006, pp. 45-50.
English-language Translation of "Quasi-Dynamic Multi-Layered Photonic Network Design Considering Different Service Holding Times", IEICE Technical Report, PN2006-18 2006, pp. 45-50.
Hideaki Tanioka et al., "Failback+: A Routing Algorithm Subject to Multiple QoS Constraints", Technical Report of IEICE, Switching Systems Engineering 98(83), 31-36, May 28, 1998. The Institute of Electronics, Information and Communication Engineers. (with English Abstract).

* cited by examiner

*Primary Examiner* — Andrew Lai
*Assistant Examiner* — Leon Andrews
(74) *Attorney, Agent, or Firm* — Fujitsu Patent Center

(57) ABSTRACT

An operator sets a path demand to be accommodated, and sets information of a device candidate, the number of ports, a path route and the like, which are demanded for a network, in an objective function that indicates a total cost when the path demand to be accommodated is newly included in the network. A mathematical programming problem for minimizing the objective function under a constraint condition derived from a configuration of the network is set, and a solution is obtained by using a solver for solving the mathematical programming problem. A device is added or the like to the network based on the obtained solution, and the demanded path is added to the network.

9 Claims, 33 Drawing Sheets

[OBJECTIVE FUNCTION]

$$\min\{10Z_A^1 + 20Z_B^1 + 5Z_C^1 + \delta X_{1,2} + \delta X_{2,1} + \delta X_{1,3} + \delta X_{3,1}\}$$

FIG. 9

[NODE CONSTRAINT CONDITIONS]    (EXAMPLE: NODE 1)

■FLOW CONSERVATION LAW    $X_{1,2} - X_{2,1} + X_{1,3} - X_{3,1} = 0$

▓DEVICE PORT NUMBER CONSTRAINT

NUMBER OF PORTS ADDED WHEN PATH 2 IS ACCOMMODATED ≦ TOTAL NUMBER OF PORTS WHEN DEVICES ARE SELECTED − NUMBER OF PORTS USED FOR PATH 1

$0X_{1,2} + 5X_{2,1} + 5X_{1,3} + 0X_{3,1} \leq \underline{12Z_A^1 + 24Z_B^1 + 10Z_C^1} - 12$ ▓DEVICE SELECTION CONSTRAINT    $Z_A^1 + Z_B^1 + Z_C^1 \leq 1$

F I G. 1 0

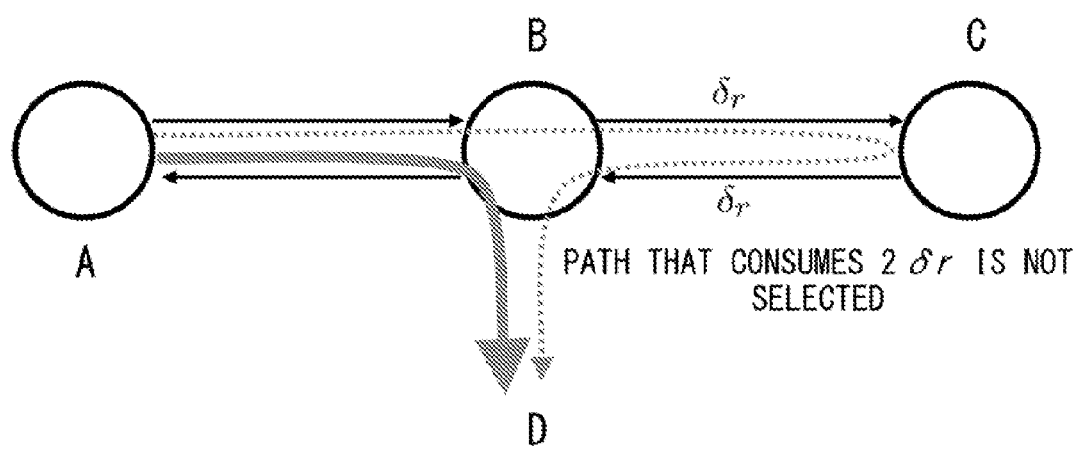
F I G. 1 2

TABLE 1: VARIABLE/FUNCTION GROUP

| VARIABLE NAME | APPLICATION | DEFINITION |
|---|---|---|
| $Z_{m,k}$ | Design | WHETHER OR NOT TO ARRANGE DEVICE k AT SITE m ($\in V$) |
| $X_{r,(i,j)}^{(s,d)} \in \{0,1\}$ | Design | WHETHER OR NOT ROUTE GOES THROUGH TRAFFIC OF (s, d) SECTION DEMAND OF (i→j) LINK WITH LINE TYPE r |
| $C_{m,k}$ | Given | COST (AMOUNT OF POWER CONSUMPTION) OF DEVICE k THAT CAN BE ARRANGED AT SITE m |
| $\delta_r$ | Given | SMALL COEFFICIENT FOR EACH LINE TYPE r |
| $H^{(s,d)}$ | Given | UPPER LIMIT VALUE OF NUMBER OF HOPS FOR (s, d) SECTION DEMAND |
| $B^{(s,d)}$ | Given | BAND DEMAND FOR (s, d) SECTION DEMAND |
| $U_r()$ | Given | FUNCTION TO DERIVE LINK TRAFFIC VOLUME HAVING LARGER TRANSFER AMOUNT OF LINKS IN BOTH DIRECTIONS, AND NUMBER OF USED PORTS OF LINE TYPE r |
| $P_{r,k}$ | Given | NUMBER OF PORTS OF LINE TYPE r INCLUDED IN DEVICE k |
| $E_{r,m}$ | Given | NUMBER OF PORTS OF LINE TYPE r USED AS SOURCE/DESTINATION OF TRAFFIC AT SITE m |
| $LA_{r,(i,j)}$ | Given | PORTS, WHICH CAN BE MULTIPLEXED, OF LINE TYPE r ON LINK BETWEEN SITES (i, j) |

Integrated Network Design (Global Optimization)

Minimize $$\sum_{m}\sum_{k}(C_{m,k} * Z_{m,k}) + \sum_{s,d}\sum_{r}\sum_{i,j}(\delta_r * X_{r,(i,j)}^{(s,d)})$$

subject to $$\sum_{r}\left(\sum_{j}X_{r,(i,j)}^{(s,d)} - \sum_{j}X_{r,(j,i)}^{(s,d)}\right) = \begin{cases} 1 & \forall(s,d), i = s \\ -1 & \forall(s,d), i = d \\ 0 & \forall(s,d), i \neq s,d \end{cases} \quad \forall(s,d)$$

$$\sum_{r}\sum_{i,j}X_{r,(i,j)}^{(s,d)} \leq H^{(s,d)} \quad \forall(s,d)$$

$$\sum_{k}Z_{m,k} \leq 1 \quad \forall m$$

$$\sum_{r}U_r\left(\max\left[\sum_{(s,d)}B^{(s,d)}X_{r,(i,j)}^{(s,d)}, \sum_{(s,d)}B^{(s,d)}X_{r,(j,i)}^{(s,d)}\right]\right)$$
$$\leq \sum_{k}P_{r,k}Z_{m,k} - E_{r,m} \quad \forall r, m$$

$$\sum_{r}U_r\left(\max\left[\sum_{(s,d)}B^{(s,d)}X_{r,(i,j)}^{(s,d)}, \sum_{(s,d)}B^{(s,d)}X_{r,(j,i)}^{(s,d)}\right]\right) \leq LA_{r,(i,j)}$$
$$\forall r, (i,j) \in E$$

F I G. 14

EACH DEMAND IS ACCOMMODATED

Integrated Network Design (Incremental Optimization)

Minimize $$\sum_m \sum_k (C_{m,k} * Z_{m,k}) + \sum_r \sum_{ij} (\delta_r * X_{r,(ij)})$$

subject to $$\sum_r \left( \sum_j X_{r,(ij)} - \sum_j X_{r,(ji)} \right) = \begin{cases} 1 & \forall i = s \\ -1 & \forall i = d \\ 0 & \forall i \neq s,d \end{cases}$$

$$\sum_r \sum_{ij} X_{r,(ij)} \leq H$$

$$\sum_k Z_{m,k} \leq 1 \quad \forall m$$

$$\sum_j \left\{ \left( U_r(\max[(B + R_{m,j}), P_{j,m}]) - u^r_{i,j} \right) X_{r,(mj)} - \sum_{q \neq r} (u^q_{i,j} X_{q,(mj)}) \right.$$
$$\left. + \left( U_r(\max[(B + R_{j,m}), R_{j,m}]) - u^r_{j,m} \right) X_{r,(jm)} - \sum_{q \neq r} (u^q_{j,m} X_{q,(jm)}) \right\}$$
$$+ u^r_{i,j} \right\} \leq \sum_k P_{r,k} Z_{m,k} - E_{r,m} \quad \forall r, m$$

$$\sum_r U_r(\max[B + R_{ij}), R_{j,i}]) X_{r,(ij)} \leq LA_{r,(ij)} \quad \forall (i,j) \in E$$

TABLE 2: VARIABLE/FUNCTION GROUP

| VARIABLE NAME | APPLI-CATION | DEFINITION |
|---|---|---|
| $Z_{m,k} \in \{0,1\}$ | Design | WHETHER OR NOT TO ARRANGE DEVICE k AT SITE m ($\in V$) |
| $X_{r,(ij)} \in \{0,1\}$ | Design | WHETHER OR NOT ROUTE GOES THROUGH TRAFFIC OF (s,d) SECTION DEMAND OF (i→j) LINK OF LINE TYPE r |
| $C_{m,k}$ | Given | COST (AMOUNT OF POWER CONSUMPTION) OF DEVICE k THAT CAN BE ARRANGED AT SITE m |
| $\delta_r$ | Given | SMALL COEFFICIENT FOR EACH LINE TYPE |
| $H$ | Given | UPPER LIMIT VALUE OF NUMBER OF HOPS FOR DESIGN DEMAND |
| $B$ | Given | BAND DEMAND FOR DEMAND TO BE DESIGNED |
| $R^r_{ij}$ | Given | TRAFFIC TRANSFER VOLUME FOR (i,j) LINK OF LINE TYPE r |
| $u^r_{i,j} (= u^r_{j,i})$ | Given | NUMBER OF PORTS OF LINE TYPE r USED BETWEEN SITES i AND j |
| $U_r()$ | Given | FUNCTION TO CALCULATE LINK TRAFFIC VOLUME HAVING LARGER TRANSFER AMOUNT OF LINKS IN BOTH DIRECTIONS, AND NUMBER OF USED PORTS OF LINE TYPE r |
| $P_{r,k}$ | Given | NUMBER OF PORTS OF LINE TYPE r INCLUDED IN DEVICE k |
| $E_{r,m}$ | Given | NUMBER OF PORTS OF LINE TYPE r USED AS SOURCE/DESTINATION OF TRAFFIC AT SITE m |
| $LA_{r,(i,j)}$ | Given | PORTS, WHICH CAN BE MULTIPLEXED, OF LINE TYPE r ON LINK BETWEEN SITES (i,j) |

F I G. 1 6

[OBJECTIVE FUNCTION DATA]

$\underline{z_{1,A}\ z_{1,B}\ z_{1,C}\ z_{2,A}\ z_{2,B}\ z_{2,C}\ z_{3,A}\ z_{3,B}\ z_{3,C}\ x_{1,(1,2)}\cdots\ x_{1,(3,2)}\ x_{2,(1,2)}\cdots\ x_{2,(3,2)}}$ $\text{f.obj} = c(10, 20, 5, 10, 20, 5, 10, 20, 5, 0.001, \ldots, 0.001, 0.002, \ldots, 0.002)$

[CONSTRAINT FORMULA DATA]

$\underline{z_{1,A}\ z_{1,B}\ z_{1,C}\ z_{2,A}\ z_{2,B}\ z_{2,C}\ z_{3,A}\ z_{3,B}\ z_{3,C}\ x_{1,(1,2)}\cdots\ x_{1,(3,2)}\ x_{2,(1,2)}\cdots\ x_{2,(3,2)}}$

| f.con | f.dir | f.rhs |
|---|---|---|

$\text{f.dir} = c("=", "=", "=", ", \ldots, " \leq ")$ $\text{f.rhs} = c(1, -1, 0, 1, 1, -1, 0, -1, 0, 0, 0, 1, 1, 1, 1, 1, 1)$

[0-1 INTEGER PROGRAMMING SOLVER]

lp("min", f.obj, f.con, f.dir, f.rhs, all.bin = T)$solution ⟹

[OUTPUT DATA]

$z_{1,C}\quad z_{2,C}\quad x_{1,(1,2)}$ $0, 0, \underline{1}, 0, 0, \underline{1}, 0, 0, 0, \underline{1}, 0, 0, \ldots, 0, 0$

TABLE 3: VARIABLE/FUNCTION GROUP

| VARIABLE NAME | APPLI-CATION | DEFINITION |
|---|---|---|
| $Z_{m,k} \in \{0,1\}$ | Design | WHETHER OR NOT TO ARRANGE DEVICE k AT SITE m ($\in V$) |
| $L_{r,(i,j)} \in \{0,1\}$ | Design | WHETHER OR NOT TO USE LINK OF LINE TYPE r DEFINED BETWEEN (i, j) $\in E$ |
| $C_{m,k}$ | Given | COST (AMOUNT OF POWER CONSUMPTION) OF DEVICE k THAT CAN BE ARRANGED AT SITE m |
| $\delta_r$ | Given | SMALL COEFFICIENT FOR EACH LINE TYPE r |
| $R_{ij}$ | | VOLUME OF TRAFFIC ALREADY TRANSFERRED ON (i→j) LINK |
| $U_r(\ )$ | Given | FUNCTION TO CALCULATE LINK TRAFFIC VOLUME HAVING LARGER TRANSFER AMOUNT OF LINKS IN BOTH DIRECTIONS |
| $P_{r,k}$ | Given | NUMBER OF PORTS OF LINE TYPE r INCLUDED IN DEVICE k |
| $E_{r,m}$ | Given | NUMBER OF PORTS OF LINE TYPE r USED AS SOURCE/DESTINATION OF TRAFFIC AT SITE m |
| $LA_{r,(i,j)}$ | Given | PORTS, WHICH CAN BE MULTIPLEXED, OF LINE TYPE r ON LINK BETWEEN SITES (i,j) |

─ Network Structure Design (Global Optimization) ─

Minimize $$\sum_m \sum_k (C_{m,k} * Z_{m,k}) + \sum_r \sum_{ij} (\delta_r * L_{r,(i,j)})$$

subject to $$\sum_k Z_{m,k} \leq 1 \quad \forall m$$

$$\sum_r L_{r,(i,j)} = 1 \quad \forall (i,j)$$

$$\sum_{j \neq m} U_r\left(\max[R_{m,j}, R_{j,m}]\right) L_{r,(m,j)} \leq \sum_k p_{r,k} Z_{m,k} \quad \forall r, m$$

$$\sum_r U_r\left(\max[R_{i,j}, R_{j,i}]\right) L_{r,(i,j)} \leq LA_{r,(i,j)} \quad \forall (i,j) \in E$$

[OBJECTIVE FUNCTION DATA]

$z_{1,A}\ z_{1,B}\ z_{1,C}\ z_{2,A}\ z_{2,B}\ z_{2,C}\ z_{3,A}\ z_{3,B}\ z_{3,C}\ L_{1,(1,2)}\ L_{1,(1,3)}\ L_{1,(2,3)}\ L_{2,(1,2)}\ L_{2,(1,3)}\ L_{2,(2,3)}$ f.obj = c(10, 20, 5, 10, 20, 5, 10, 20, 5, 0.001, 0.001, 0.001, 0.002, 0.002, 0.002)

[CONSTRAINT FORMULA DATA]

$z_{1,A}\ z_{1,B}\ z_{1,C}\ z_{2,A}\ z_{2,B}\ z_{2,C}\ z_{3,A}\ z_{3,B}\ z_{3,C}\ L_{1,(1,2)}\ L_{1,(1,3)}\ L_{1,(2,3)}\ L_{2,(1,2)}\ L_{2,(1,3)}\ L_{2,(2,3)}$

| f.con | f.dir | f.rhs |
|---|---|---|
|  |  |  | f.dir = c(" ≤ ", " ≤ ", " ≤ ", ..., " ≤ ", " ≤ ")
f.rhs = c(1, 1, 1, 1, 1, −13, −8, −9, 1, 1, 1)

[0−1 INTEGER PROGRAMMING SOLVER]
lp(" min ", f.obj, f.con, f.dir, f.rhs, all.bin = T)$solution

[OUTPUT DATA]

$z_{1,B}\ z_{2,A}\ z_{3,A}\ \phantom{xxxxxxxxxxxx} L_{2,(1,3)}\ L_{2,(2,3)}$
0, 1, 0, 1, 0, 0, 1, 0, 0, 0, 0, 0, 0, 1, 1, 1

FIG. 23

TABLE 1: VARIABLE/FUNCTION GROUP

| VARIABLE NAME | APPLICATION | DEFINITION |
|---|---|---|
| $Z_{m,k}$ | Design | NUMBER OF CARD TYPES k IN DEVICE COMPONENT p THAT CAN BE ARRANGED AT SITE m ($\in E$) |
| $X_{r,(i,j)}^{(s,d)} \in \{0,1\}$ | Design | WHETHER OR NOT ROUTE GOES THROUGH TRAFFIC OF (s,d) SECTION DEMAND OF (i→j) LINK OF LINE TYPE r |
| $C_{m,k}^p$ | Given | COST (AMOUNT OF POWER CONSUMPTION) OF CARD TYPE k IN DEVICE PART p THAT CAN BE ARRANGED AT SITE m |
| $\delta_r$ | Given | SMALL COEFFICIENT FOR EACH LINE TYPE r |
| $H^{(s,d)}$ | Given | UPPER LIMIT VALUE OF NUMBER OF HOPS FOR (s,d) SECTION DEMAND |
| $S_{m,k}$ | Given | NUMBER OF SLOTS INCLUDED IN COMMON PART k THAT CAN BE ARRANGED AT SITE m |
| $B^{(s,d)}$ | Given | BAND DEMAND FOR (s,d) SECTION DEMAND |
| $U_r(\ )$ | Given | FUNCTION TO CALCULATE NUMBER OF USED PORTS OF LINE TYPE r BY USING LINK TRAFFIC VOLUME HAVING LARGER TRANSFER VOLUME OF LINKS IN BOTH DIRECTIONS |
| $p_{r,k}$ | Given | NUMBER OF PORTS OF LINE TYPE r MOUNTED ON NW CARD k |
| $E_{r,m}$ | Given | NUMBER OF PORTS OF LINE TYPE r USED AS SOURCE/DESTINATION OF TRAFFIC AT SITE m |
| $LA_{r,(i,j)}$ | Given | PORTS, WHICH CAN BE MULTIPLEXED, OF LINE TYPE r ON LINK BETWEEN SITES (i,j) |

Package-Type Integrated Network Design (Global Optimization)

Minimize $$\sum_m \sum_k (C_{m,k}^{z_1} \cdot Z_{m,k}^{z_1}) + \sum_{(s,d)} \sum_r \sum_{(i,j)} (\delta_r \cdot X_{r,(i,j)}^{(s,d)})$$

subject to $$\sum_r \left( \sum_j X_{r,(i,j)}^{(s,d)} - \sum_j X_{r,(j,i)}^{(s,d)} \right) = \begin{cases} 1 & \forall (s,d), i = s \\ -1 & \forall (s,d), i = d \\ 0 & \forall (s,d), i \neq s, \neq d \end{cases}$$

$$\sum_r \sum_{(i,j)} X_{r,(i,j)}^{(s,d)} \le 1 \quad \forall (s,d)$$

$$\sum_k Z_{m,k}^{z_1} \le \sum_k S_{m,k} Z_{m,k}^{z_2} \quad \forall m$$

$$\sum_k (Z_{m,k}^{z_1} + Z_{m,k}^{z_2}) \le \sum_k p_{r,k} Z_{m,k}^{z_3} \quad \forall m$$

$$E_{r,m} \le \sum_k p_{r,k} Z_{m,k}^{z_3} \quad \forall r, m$$

$$\sum_r U_r \left( \max\{ \sum_{(s,d)} B^{(s,d)} X_{r,(i,j)}^{(s,d)}, \sum_{(s,d)} B^{(s,d)} X_{r,(j,i)}^{(s,d)} \} \right) \le \sum_k p_{r,k} Z_{m,k}^{z_2} \quad \forall r, m$$

$$U_r \left( \max\{ \sum_{(s,d)} B^{(s,d)} X_{r,(i,j)}^{(s,d)}, \sum_{(s,d)} B^{(s,d)} X_{r,(j,i)}^{(s,d)} \} \right) \le LA_{r,(i,j)} \quad \forall r, (i,j) \in E$$

FIG. 26

TABLE 4: VARIABLE/FUNCTION GROUP

| VARIABLE NAME | APPLICATION | DEFINITION |
|---|---|---|
| $Z_{m,k}^p$ | Design | NUMBER OF CARD TYPES k IN DEVICE COMPONENT p THAT CAN BE ARRANGED AT SITE m ($\in E$) |
| $X_{r,(ij)} \in \{0,1\}$ | Design | WHETHER OR NOT ROUTE GOES THROUGH TRAFFIC SECTION DEMAND OF (i→j) LINK OF LINE TYPE r |
| $C_{m,k}^p$ | Given | COST (AMOUNT OF POWER CONSUMPTION) OF CARD TYPE k IN DEVICE PART p THAT CAN BE ARRANGED AT SITE m |
| $\delta_r$ | Given | SMALL COEFFICIENT FOR EACH LINE TYPE r |
| $H$ | Given | UPPER LIMIT VALUE OF NUMBER OF HOPS FOR DESIGN DEMAND |
| $S_{m,k}$ | Given | NUMBER OF SLOTS INCLUDED IN COMMON PART k THAT CAN BE ARRANGED AT SITE m |
| $B$ | Given | BAND DEMAND FOR PARTICULAR DEMAND TO BE DESIGNED |
| $R_{ij}$ | Given | TRAFFIC VOLUME ALREADY SET FOR (i→j) LINK |
| $u_{i,j}^r (= u_{j,i}^r)$ | Given | NUMBER OF PORTS OF LINE TYPE r USED BETWEEN SITES i AND j |
| $U_r()$ | Given | FUNCTION TO CALCULATE NUMBER OF PORTS OF LINE TYPE r BY USING LINK TRAFFIC VOLUME HAVING LARGER TRANSFER VOLUME OF LINKS IN BOTH DIRECTIONS |
| $p_{r,k}$ | Given | NUMBER OF PORTS OF LINE TYPE r MOUNTED ON NW CARD k |
| $E_{r,m}$ | Given | NUMBER OF PORTS OF LINE TYPE r USED AS SOURCE/DESTINATION OF TRAFFIC AT SITE m |
| $LA_{r,(i,j)}$ | Given | NUMBER OF PORTS, WHICH CAN BE MULTIPLEXED, OF LINE TYPE r ON LINK BETWEEN (i,j) |

—— Integrated Network Design (Incremental Optimization) ——

Minimize $$\sum_m \sum_k \sum_p (C_{m,k}^p * Z_{m,k}^p) + \sum_r \sum_{ij} (\delta_r * X_{r,(ij)})$$

subject to $$\sum_r \left( \sum_j X_{r,(ij)} - \sum_j X_{r,(ji)} \right) = \begin{cases} 1 & \forall i = s \\ -1 & \forall i = d \\ 0 & \forall i \neq s,d \end{cases}$$

$$\sum_r \sum_{ij} X_{r,(ij)} \leq H \quad \forall r$$

$$\sum_k (Z_{m,k}^1 + Z_{m,k}^2) \leq \sum_k s_{m,k} Z_{m,k}^0 \quad \forall r,m$$

$$E_{r,m} \leq \sum_k p_{r,k} Z_{m,k}^2 \quad \forall r,m$$

$$\sum_q \left\{ \left( U_r(\max(B + R_{(q,j)}, R_{(j,q)})) - u_{q,j}^r \right) X_{r,(qj)m} - \sum_{q \neq p} (u_{q,j}^r X_{q,(qj)m}) \right.$$
$$\left. + \left( U_r(\max(B + R_{(j,q)}, R_{(q,j)})) - u_{j,m}^r \right) X_{r,(jm)m} - \sum_{q \neq p} (u_{j,q}^r X_{q,(jq)m}) \right\}$$
$$+ u_{i,j}^r \leq \sum_k p_{r,k} Z_{m,k}^2 \quad \forall r,m$$

$$U_r(\max(B + R_{ij}, R_{ji})) X_{r,(ij)} \leq LA_{r,(i,j)} \quad \forall (i,j) \in E$$

F I G. 27

[OBJECTIVE FUNCTION DATA]

$$\underline{z_{1,A}^0\ z_{1,B}^0\ z_{1,C}^0\ z_{1,D}^1\ z_{1,E}^1\ z_{1,F}^2\ z_{2,A}^0\ z_{2,B}^0\ z_{2,C}^1\ z_{2,D}^1\ z_{2,E}^2\ z_{2,F}^2\ X_{1,(12)}\ X_{1,(21)}\ X_{2,(12)}\ X_{2,(21)}}$$

$$\mathrm{f.obj} = c(100, 200, 10, 20, 20, 30, 100, 200, 10, 20, 20, 30, 0.001, 0.001, 0.002, 0.002)$$

[CONSTRAINT FORMULA DATA]

$$\underline{z_{1,A}^0\ z_{1,B}^0\ z_{1,C}^0\ z_{1,D}^1\ z_{1,E}^1\ z_{1,F}^2\ z_{2,A}^0\ z_{2,B}^0\ z_{2,C}^1\ z_{2,D}^1\ z_{2,E}^2\ z_{2,F}^2\ X_{1,(12)}\ X_{1,(21)}\ X_{2,(12)}\ X_{2,(21)}}$$

| f.con | f.dir | f.rhs |
|---|---|---|
|  |  |  |

$$\mathrm{f.dir} = c("\leq", "\leq", "\leq", "\leq", \ldots, "\leq", "\leq")$$

$$\mathrm{f.rhs} = c(1, -1, 1, 1, 0, 0, -10, -10, -3, -10, -3, -1, -3, -1, 1, 1)$$

[INTEGER PROGRAMMING SOLVER]

lp("min", f.obj, f.con, f.dir, f.rhs, all.int = T)$solution

[OUTPUT DATA]

$$\underline{z_{1,A}^0\ z_{1,B}^0\ z_{1,C}^0\ z_{1,D}^1\ z_{1,E}^1\ z_{1,F}^2\ z_{2,A}^0\ z_{2,B}^0\ z_{2,C}^1\ z_{2,D}^1\ z_{2,E}^2\ z_{2,F}^2\ X_{1,(12)}\ X_{1,(21)}\ X_{2,(12)}\ X_{2,(21)}}$$
$$1, 0, 0, 2, 0, 1, 1, 0, 0, 2, 0, 1, 0, 0, 1, 0$$

FIG. 29

Package-Type Network Structure Design (Global Optimaization)

Minimize $$\sum_m \sum_k \sum_p (C^p_{m,k} * Z^p_{m,k}) + \sum_r \sum_{i,j} (\delta_r * L_{r,(i,j)})$$

subject to $$\sum_k Z^0_{m,k} \leq 1 \quad \forall m$$

$$\sum_r L_{r,(i,j)} = 1 \quad \forall (i,j)$$

$$\sum_k (Z^1_{m,k} + Z^2_{m,k}) \leq \sum_k s_{m,k} Z^0_{m,k} \quad \forall m$$

$$E_{r,m} \leq \sum_k p_{r,k} Z^1_{m,k}$$

$$\sum_{j \neq m} U_r\left(\max\{R_{m,j}, R_{j,m}\}\right) L_{r,(m,j)} \leq \sum_k p_{r,k} Z^2_{m,k} \quad \forall r, m$$

$$\sum_r U_r\left(\max\{R_{i,j}, R_{j,i}\}\right) L_{r,(i,j)} \leq LA_{r,(i,j)} \quad \forall (i,j) \in E$$

TABLE 4: VARIABLE/FUNCTION GROUP

| VARIABLE NAME | APPLI- CATION | DEFINITION |
|---|---|---|
| $Z^p_{m,k}$ | Design | NUMBER OF CARD TYPES k IN DEVICE COMPONENT p THAT CAN BE ARRANGED AT SITE m |
| $X_{r,(i,j)} \in \{0,1\}$ | Design | WHETHER OR NOT TO USE LINK OF LINE TYPE r DEFINED BETWEEN $(i,j) \in E$ |
| $C^p_{m,k}$ | Given | COST (AMOUNT OF POWER CONSUMPTION) OF CARD TYPE k IN DEVICE PART p THAT CAN BE ARRANGED AT SITE m |
| $\delta_r$ | Given | SMALL NUMBER FOR EACH LINE TYPE r |
| $s_{m,k}$ | Given | NUMBER OF SLOTS INCLUDED IN COMMON PART k THAT CAN BE ARRANGED AT SITE m |
| $U_r()$ | Given | FUNCTION TO DERIVE NUMBER OF USED PORTS FOR LINE TYPE r USING LINK TRAFFIC |
| $p_{r,k}$ | Given | NUMBER OF PORTS OF LINE TYPE r MOUNTED ON NW CARD k |
| $E_{r,m}$ | Given | NUMBER OF PORTS OF LINE TYPE r USED AS SOURCE/DESTINATION OF TRAFFIC AT SITE m |
| $LA_{r,(i,j)}$ | Given | NUMBER OF PORTS, WHICH CAN BE MULTIPLEXED, OF LINE TYPE r ON LINK BETWEEN SITES $(i,j)$ |

FIG. 30

[OBJECTIVE FUNCTION DATA]

$$z_{1,A}^0 \; z_{1,B}^0 \; z_{1,C}^0 \; z_{1,D}^0 \; z_{1,E}^1 \; z_{1,F}^1 \; z_{2,A}^2 \; z_{2,B}^2 \; z_{2,C}^2 \; z_{2,D}^2 \; z_{2,E}^2 \; z_{2,F}^2 \; L_{1,(1,2)} \; L_{2,(1,2)}$$

$$\text{f.obj} = c(100, 200, 10, 20, 20, 30, 100, 200, 10, 20, 20, 30, 0.001, 0.002)$$

[CONSTRAINT FORMULA DATA]

$$z_{1,A}^0 \; z_{1,B}^0 \; z_{1,C}^0 \; z_{1,D}^0 \; z_{1,E}^1 \; z_{1,F}^1 \; z_{2,A}^2 \; z_{2,B}^2 \; z_{2,C}^2 \; z_{2,D}^2 \; z_{2,E}^2 \; z_{2,F}^2 \; L_{1,(1,2)} \; L_{2,(1,2)}$$

| f.con | f.dir | f.rhs |
|---|---|---|
|  |  |  |

$$\text{f.dir} = c(" \leq ", " \leq ", " \leq ", \ldots, " \leq ", " \leq ")$$
$$\text{f.rhs} = c(1, 1, 1, 0, 0, -75, -55, 0, 0, 0, 0, 1)$$

[INTEGER PROGRAMMING SOLVER]

lp("min", f.obj, f.con, f.dir, f.rhs, all.bin = T)$solution

[OUTPUT DATA]

$$z_{1,A}^0 \; z_{1,B}^0 \; z_{1,C}^0 \; z_{1,D}^1 \; z_{1,F}^1 \; z_{2,A}^2 \; z_{2,D}^2 \; z_{2,F}^2 \; L_{2,(1,2)}$$
$$\underline{1}, 0, 0, \underline{4}, 0, \underline{1}, \underline{1}, 0, 0, \underline{3}, 0, \underline{1}, 0, \underline{1}$$

F I G. 3 2

NETWORK DESIGN SYSTEM

CROSS-REFERENCE TO RELATED APPLICATION

This application is based upon and claims the benefit of priority of the prior Japanese Patent Application No. 2011-035010, filed on Feb. 21, 2011, the entire contents of which are incorporated herein by reference.

FIELD

The embodiment discussed herein is related to a network design system for simultaneously designing a device configuration, a route, and the number of used physical ports (link aggregation), which minimize a cost (power, the amount of money), when a path demand between sites is accommodated.

BACKGROUND

With an increase in traffic flowing into a network, a network device has been growing in size and improving in performance, and the amount of power consumption and an operating cost (referred to as a cost inclusive of the amount of power consumption and the operating cost) has been increasing.

In the meantime, redundant lines and devices are arranged to accommodate traffic in many cases in a current network. With an optimum arrangement of lines and devices, cost reductions such as power saving and the like of the entire network can be expected. However, a suitable arrangement of lines and devices differs depending on a traffic transfer state (path). Therefore, it is important to comprehensively consider an arrangement of a traffic route (path), lines and devices, and the like when a power-saving network configuration is derived.

Incidentally, there is a problem that a network design in consideration of a dependency among diverse design elements (route, line, device) is difficult with a conventional manual design. Therefore, a technique for automatically designing a network configuration that minimizes power (or cost) by systematizing a design process in consideration of a correlation among the design elements is demanded.

As a conventional method of making a network design including a route, there is an incremental design method of accommodating each path demand (a demand for laying a communication route between desired sites with a desired capacity). A MAX-PACK method of determining a traffic transfer route so that an expansion (line addition) cost is minimized is normally known.

This conventional method does not lose generality, also enabling a route design that minimizes power even if cost (the amount of money) is replaced with the amount of power consumption.

These methods mainly aim at minimizing a cost (the amount of money or power) of each added line (port) as an expansion (line addition) cost. However, there are not so many actual network devices that can be added in units of ports.

By way of example, for a box type device implemented by incorporating a port group of each line type into a housing, design measures are taken such that the device is left unchanged if the available ports of the device remain, or the device is replaced if the number of ports of the device is insufficient as a result of adding a port when a path is accommodated.

Similarly, for a chassis type device implemented by handling a port group of each line type as a network card (package), design measures are taken such that the device is left unchanged if the available ports of the network card remain, or the device is replaced with a network card that can accommodate a corresponding number of ports if the number of ports of the network card is insufficient as a result of adding a port when a path is accommodated.

This means that the cost is not determined in units of ports but in units of devices or packages including a port group.

Accordingly, with a conventional design of a minimum cost path based on cost per port, only a change of cost (power or the amount of money) estimated by accumulating cost of each port can be determined, and a possible change of cost (power or the amount of money) incurred by arranging a device/package in an actual network cannot be suitably judged.

For example, also from the viewpoint of the amount of power consumption, the amount of power consumption of an actual device or package does not vary depending on a use state of a port, and a certain amount of power is consumed. Therefore, a change of an actual cost (power) cannot be estimated by accumulating a cost of each port.

FIGS. 1 and 2 are explanatory views of the problem of the conventional method.

A design example to which the conventional method is applied is described. As illustrated in FIG. 1, a design of a path and a line (port) when a path demand is given under a condition that a device with low cost (power) per port and a device with high cost per port are respectively arranged on an upper route and a lower route is considered. At this time, the conventional design in consideration of only cost per port produces results such that the upper route is selected and a port is simply added to an upper node.

In the meantime, a case where actual box type devices A and B illustrated in FIG. 2 are assumed by taking FIG. 1 as an example and a cost (power) per port of each of the devices is estimated as follows device A: 5/12=0.42 (cost/ports)
device B: 20/24=0.83 (cost/ports)
is considered.

Also at this time, a result such that the upper path is selected is produced with the conventional design based on a cost per port similarly to FIG. 1. Actually, however, a case where the minimum cost (power) cannot be achieved is considered as follows.

For example, in a case where the number of remaining ports is zero in the device A and the number of remaining ports is too many in the device B when a port is designed to be added at the time of path demand accommodation, 1. if the upper route is allocated, the device A needs to be replaced with the device B, leading to an increase in cost (power) incurred by replacing the device.

2. if the route goes through the device B with higher cost per port, the device B does not need to be changed because the number of ports is too many. Therefore, the cost (power) does not change.

Accordingly, assuming such an actual environment, a route selection and a line/device arrangement, which minimize a cost (power), cannot be implemented only based on a conventional cost determination made in units of ports.

PATENT DOCUMENT

[Patent Document 1] Japanese Laid-open Patent Publication No. 2009-296211

[Non-patent Document 1] "Quasi-dynamic Design in Multi-layered Photonic Network", Koichi Kanie, Hiroshi Hasegawa, Kenichi Sato, PN2006-18, pp. 45-50

SUMMARY

A network design system in one aspect of this embodiment is a network design system for designing a path and a device configuration, which are demanded for a network. The network design system includes: a setting unit configured to set an objective function that indicates a device cost, and a constraint condition to be considered when the objective function is minimized by using information of a band demand of a path newly demanded between a starting site and an end site of the demanded path, a type of a device candidate that can be arranged at each site, and information of the number of ports in each device; and a deriving unit configured to derive how to arrange a path, how to arrange a device, and the number of used ports by obtaining a solution to a mathematical programming problem for minimizing the objective function under the constraint condition.

According to the embodiment described below, a network design system that can design a route, a device, the number of used ports, and the like, which minimizes a cost increased by accommodating a path, in consideration of a relationship between an upper limit of the number of ports of each device and a cost based on device candidates is provided.

The object and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF THE DRAWINGS

FIG. 9 is an explanatory view (No. 2) of the design method according to the embodiment;

FIG. 10 is an explanatory view (No. 3) of the design method according to the embodiment;

FIG. 12 is an explanatory view of a definition of a particular parameter in the design method when a path/device selection and a line design are made in the embodiment;

FIG. 14 is an explanatory view (No. 2) of the design method when the path/device selection and the line design are made in the embodiment and solved as the global optimization problem;

FIG. 16 is a schematic (No. 2) illustrating the method implemented by adopting the incremental approach in the path/device selection and line design method according to the embodiment;

FIG. 18 is a schematic (No. 4) illustrating the method implemented by adopting the incremental approach in the path/device selection and line design method according to the embodiment;

FIG. 21 is an explanatory view (No. 3) of the line/device design method when the traffic state is explicitly given;

FIG. 23 is an explanatory view (No. 5) of the line/device design method when the traffic state is explicitly given;

FIG. 26 is an explanatory view (No. 3) of the implemented by applying a design method assuming a chassis type device to the method illustrated in FIGS. 13 and 14;

FIG. 27 is an explanatory view (No. 1) of a method implemented by applying a design method assuming a chassis type device to the method illustrated in FIGS. 15 to 18;

FIG. 29 is an explanatory view (No. 3) of the method implemented by applying the design method assuming a chassis type device to the method illustrated in FIGS. 15 to 18;

FIG. 30 is an explanatory view (No. 1) of a method implemented by applying a design method assuming a chassis type device to the method illustrated in FIGS. 19 to 23;

FIG. 32 is an explanatory view (No. 3) of the method implemented by applying a design method assuming a chassis type device to the method illustrated in FIGS. 19 to 23.

DESCRIPTION OF EMBODIMENTS

The embodiment provides a means for sequentially determining a path so that a cost of a device arranged at each site is minimized, and identifies a path so that a cost (power or the amount of money) of a device to be arranged is minimized when a path demand (a traffic band demanded between sites) is accommodated.

This embodiment is implemented with the following operations.

1. design without a cost change

Setting a path route for a path demand without changing a currently considered device.

2. If a cost is forced to be changed, a design is made so that a cost change is minimized. Selecting a device having a sufficient number of available ports, and setting a path so that a total cost (power or the amount of money) of devices is minimized.

Figure 1:
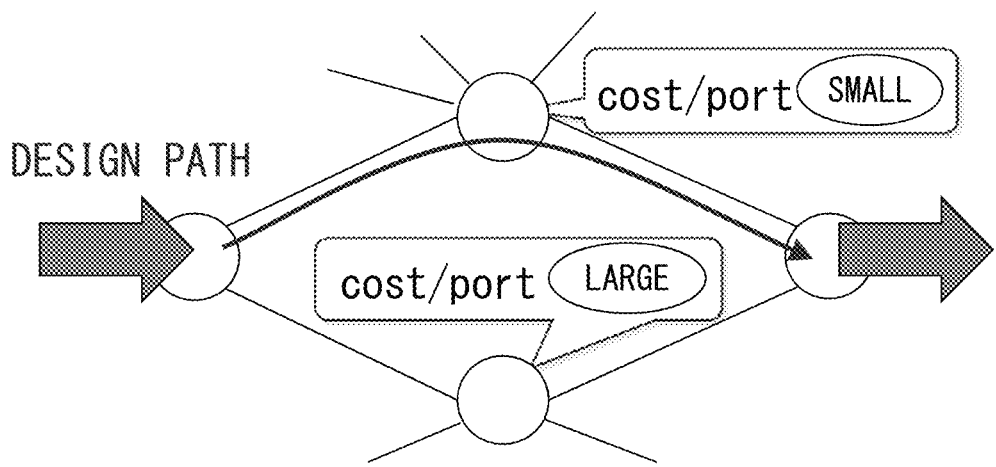
FIG. 1 is an explanatory view (No. 1) of a problem of a conventional method.
Figure 2:
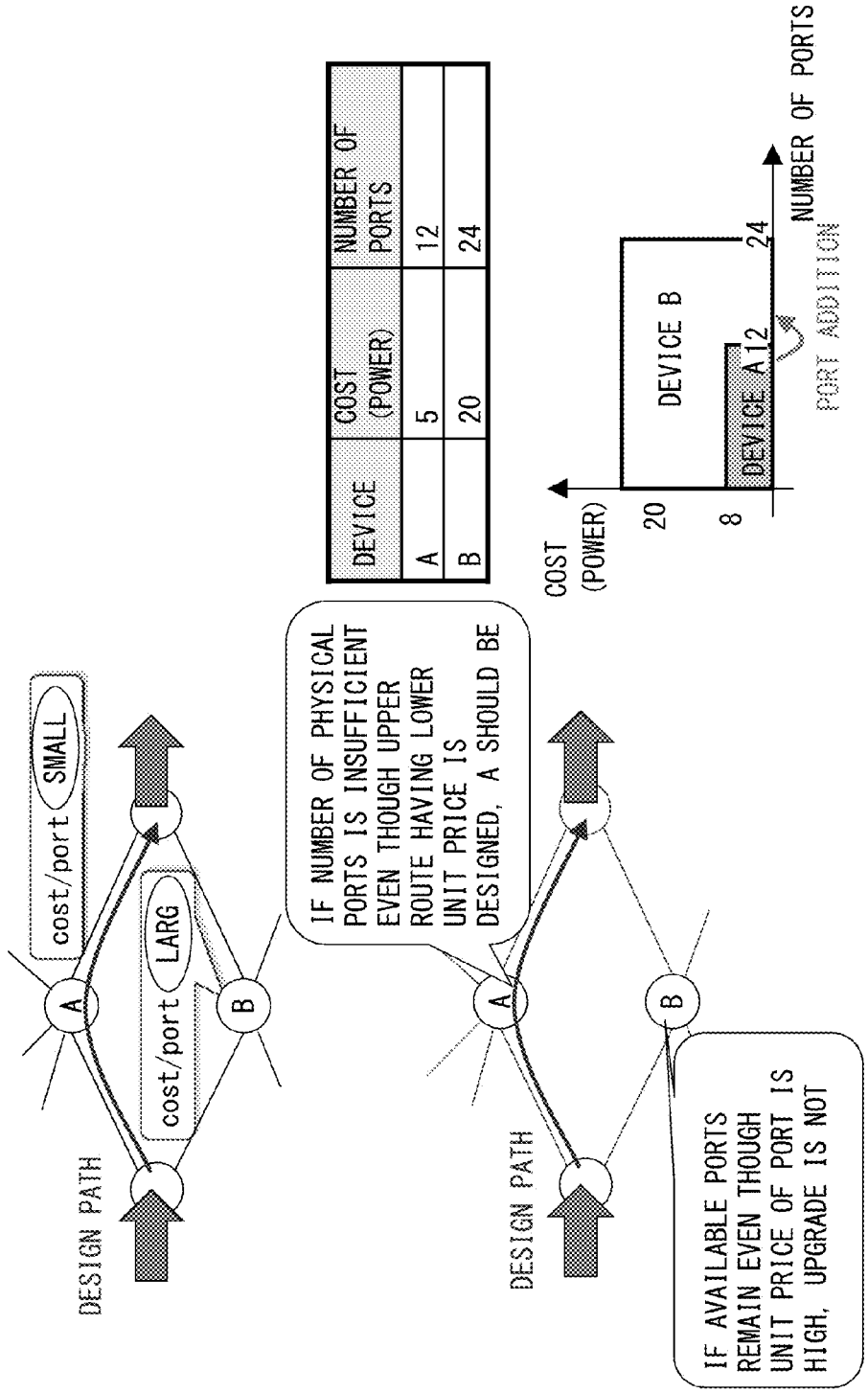
FIG. 2 is an explanatory view (No. 2) of the problem of the conventional method.
Figure 3:
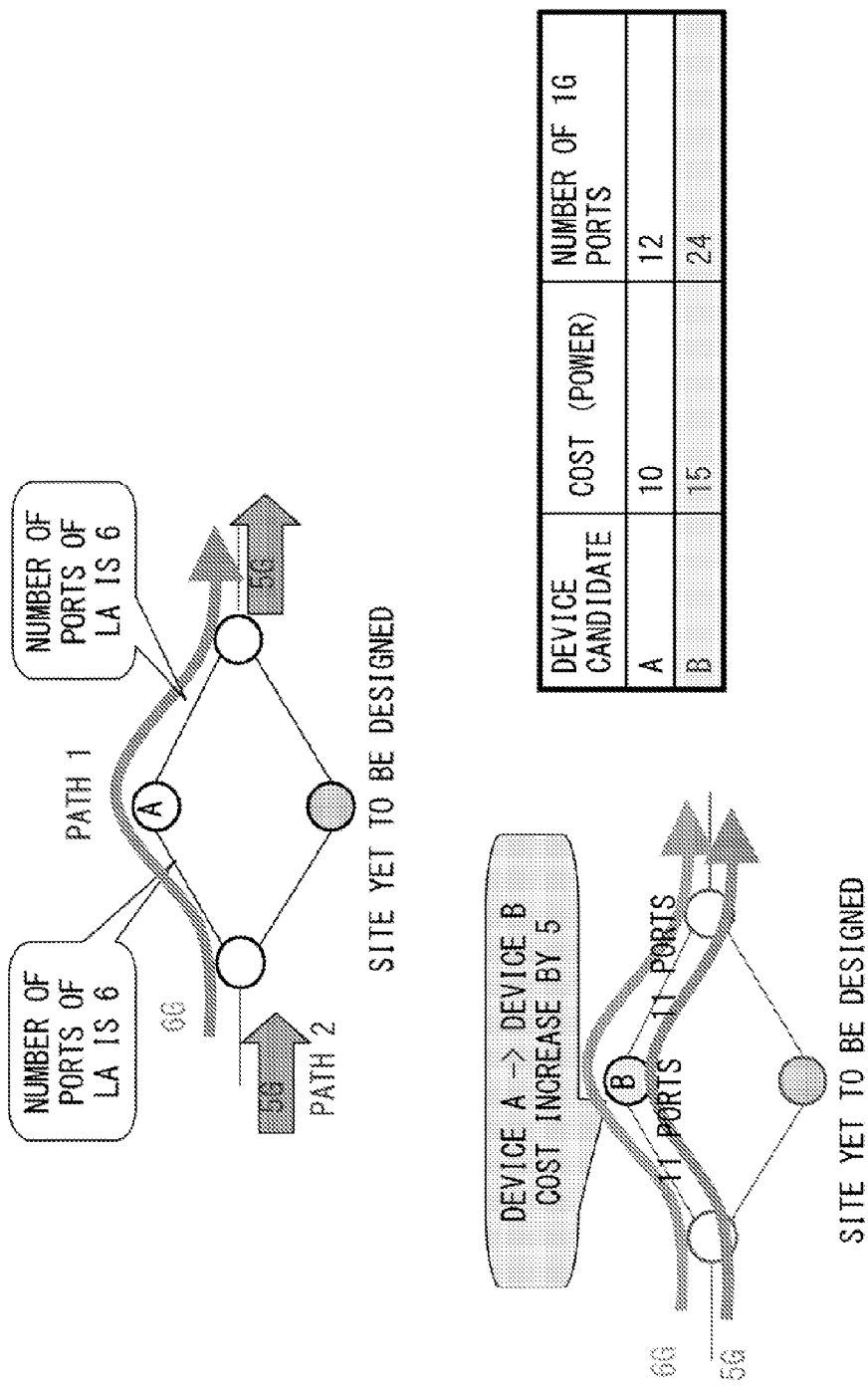
FIG. 3 is an explanatory view (No. 1) of operations of an embodiment when a cost increases.
Figure 4:
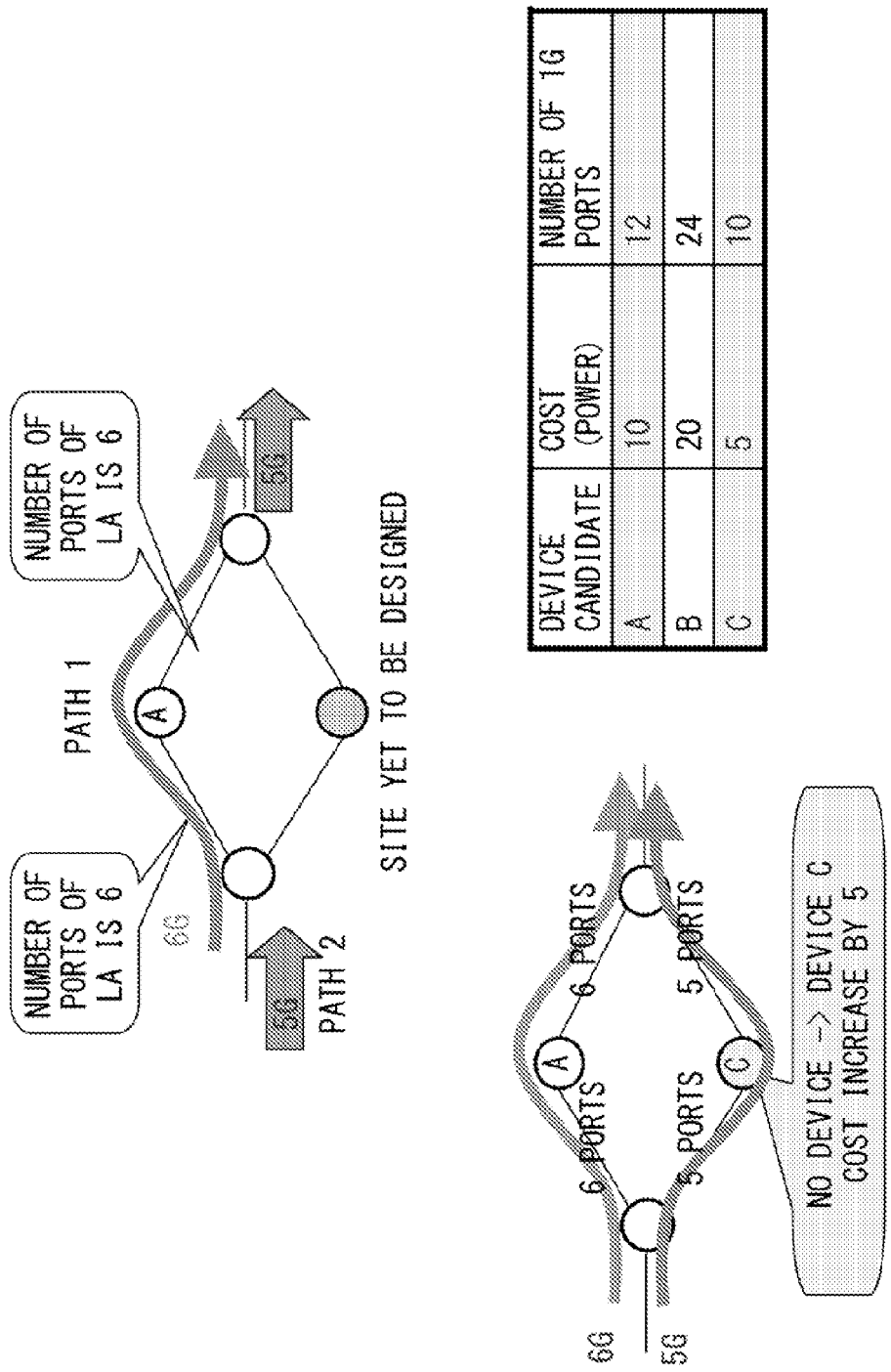
FIG. 4 is an explanatory view (No. 2) of the operations of the embodiment when a cost increases.

FIGS. 3 and 4 are explanatory views of operations of the embodiment when a cost increases.

FIG. 3 illustrates an example of sequentially designing two path demands (6 Gbps and 5 Gbps) to be accommodated under a condition that there are devices A and B that can be arranged in a network. Here, a design solution is given such that the first path 1 (6 Gbps) is already accommodated on an upper route and the device A is used. Moreover, in the device A that accommodates the path demand 1, a total of 12 ports are already determined to be arranged by designing input ports with a link aggregation of 6 ports (an aggregation of 6 links that connect 6 pairs of ports to one path) with the use of a 1-Gbps line, and by similarly designing outputs ports with 6 ports.

At this time, the next (5-Gbps) path 2 is selected to be accommodated with any of the following options when being designed to be accommodated.

If the path 2 is accommodated with a link aggregation using 5 ports respectively as input/output ports on the upper route, the number (12) of ports of the device A is insufficient. Therefore, the device A may be changed to the device B (cost increase=5).

If the path 2 is accommodated with a link aggregation using 5 ports respectively as input/output ports on the lower path, the device A with lower cost is arranged at a site where a device is not designed yet (cost increase=10).

As a result, a design solution to implement the minimum cost is to accommodate the path 2 on the upper route and to change the device A to the device B.

In contrast, FIG. 4 illustrates a case where a design condition is the same as that in the case of FIG. 3 and only a device candidate that can be arranged in a network differs. At this time, a path route is selected with any of the following options.

If the path 2 is accommodated with a link aggregation using 5 ports respectively as input/output ports on the upper route, the number (12) of ports of the device A is insufficient. Therefore, the device A may be changed to the device B (cost increase=10).

If the path 2 is accommodated with a link aggregation using 5 ports respectively as input/output ports on the lower route, a device C may be arranged at a site where a device is not designed yet (cost increase=5).

As a result, a design solution to implement the minimum cost is to accommodate the path 2 on the lower route and to arrange the device C at the site where a device is not designed yet.

As described above, a route and a device are identified based on device candidates so that a cost (power or the amount of money) incurred by arranging a device is minimized.

Figure 5:
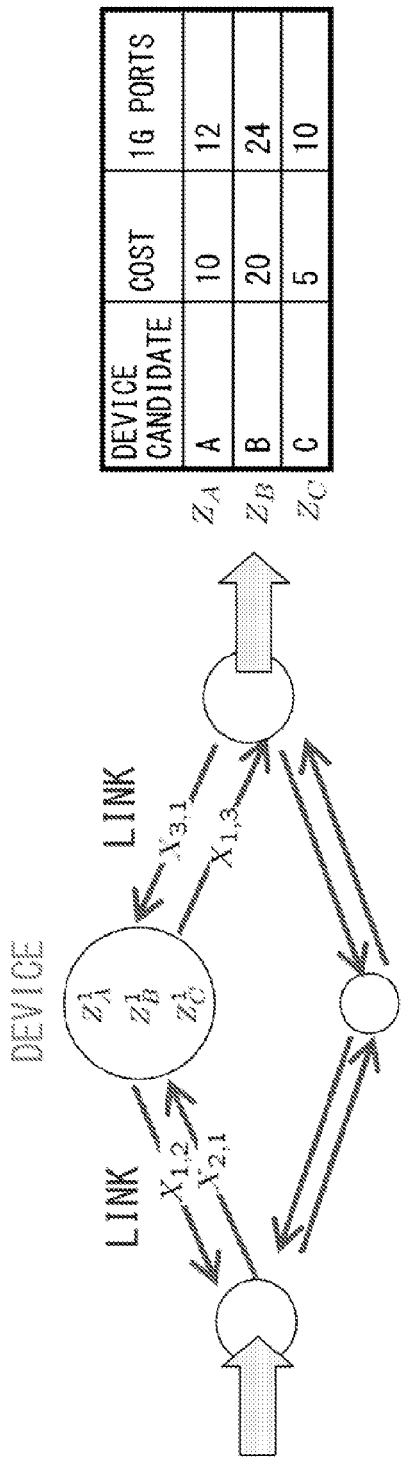
FIG. 5 is an explanatory view of problem setting used in the embodiment.

FIG. 5 is an explanatory view of problem setting used in this embodiment.

In this embodiment, as a problem of selecting a device that can accommodate a path demand, a relationship among a traffic route, a line rate and the number of used ports, and a constraint condition of an upper limit of the number of ports included in each device are formulated, and a network configuration that minimizes the total cost of devices deployed at sites is reduced to a 0-1 integer programming problem defined with a $\{0,1\}$ variable that indicates whether or not to select a route (link aggregation)/device, and a design is made with a mathematical computation.

The problem setting in this embodiment is summarized as follows. Namely, conditional formulas such as objective function: min{total cost of devices deployed at sites} constraint conditions:

a traffic flow volume conservation condition in consideration of a connection relationship an upper limit condition of the number of used ports possessed by each device a condition of a device arranged at each site (only one device exists at each site)

can be set and written as a problem of minimizing the objective function under the constraint conditions.

Design Variables:

whether or not to use a link which a route of a path demand goes through: $X \in \{0,1\}$ whether or not to use a device: $Z \in \{0,1\}$ are defined in the above described problem, and the objective function and the constraint conditions are formulated with a linear combination of these design variables, whereby a route solution (X=0, 1) and a device selection solution (Z=0, 1), which optimize the objective function, can be identified based on a mathematical computation. As link variables in this problem, two unidirectional link variables are defined for one physical link in order to design a route including a transfer direction.

Figure 6:
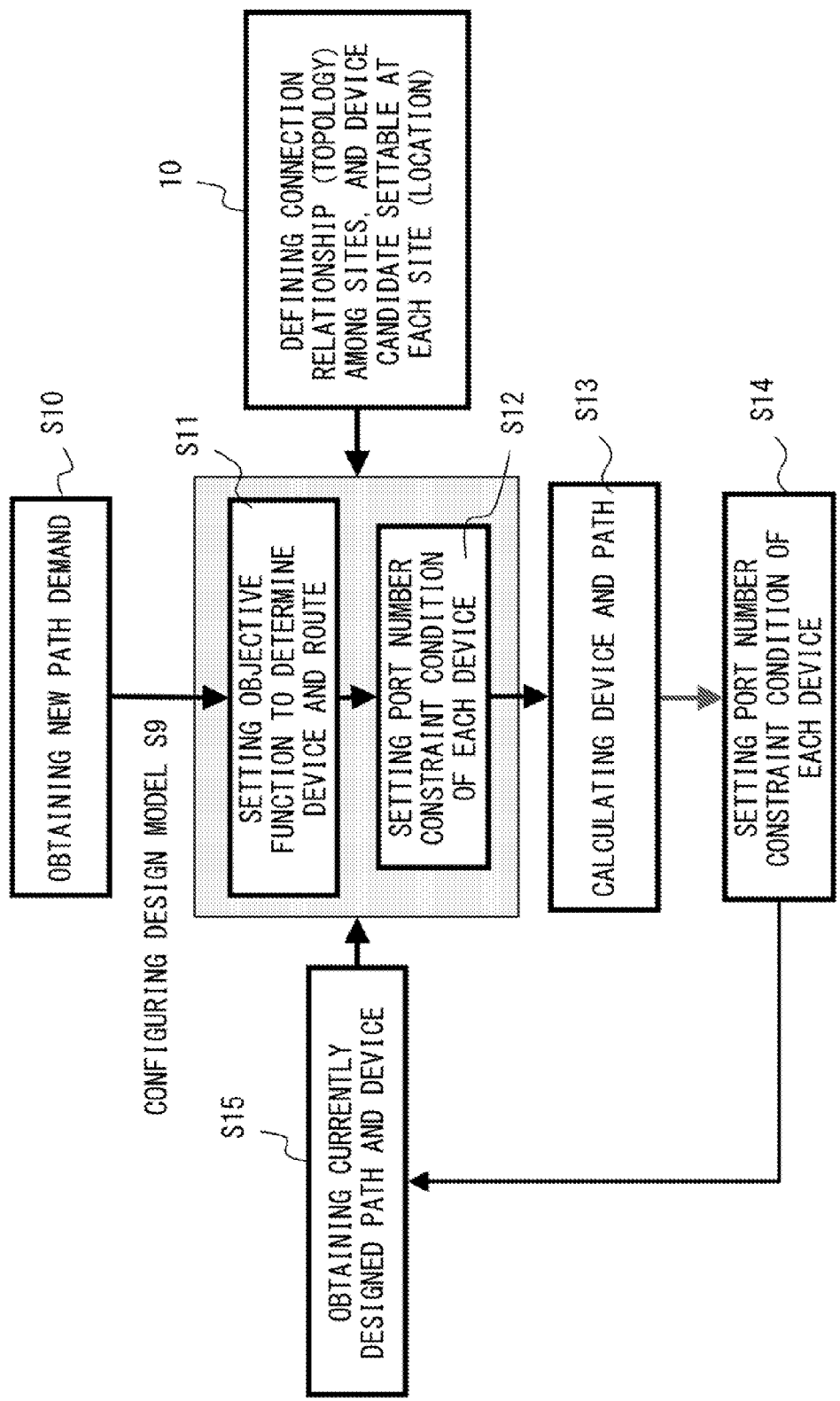
FIG. 6 is a flowchart illustrating a flow of a process in the embodiment.

FIG. 6 is a flowchart illustrating a flow of a process of this embodiment.

Initially, a path demand to be designed is obtained in step S10. In step S9, information of path and a device, which are currently designed to be accommodated, are obtained (step S15), and a design model (0-1 integer programming problem) is configured based on a connection relationship (topology) among sites, and definition information 10 of device candidates that can be arranged at each site (location). Step S9 is composed of steps S11 and S12. In step S11, an objective function to determine a device selection and a route is set. In step S12, a traffic flow volume conservation constraint, and a port number constraint condition and a device selection condition of each device are set based on the connection relationship among the sites. In step S13, a device and a path are calculated from the design model formulated in steps S9 and S10. In step S14, design results are stored. Then, the flow goes back to step S15.

For the calculations of the device and the path in step S13, an existing solver that can solve a 0-1 integer programming problem is used.

Solvers to a mathematical programming problem include free software and commercial software. By giving an input obtained by converting a structure of a linear programming problem or an integer programming problem into a format specified by each solver, a design solution to optimize (maximize or minimize) an objective function can be automatically calculated. Free solvers include the following software.

```
-GLPK:http://www.gnu.org/software/glpk/
-SCIP:http://scip.zib.de
-lp-solve:http://lpsolve.sourceforge.net/5.5/
-Clp:https://projects.coin-or.org/Clp
-OpenOpt:http://openopt.org/Welcome
```

An example problem for executing the solver lp_solve in statistic calculation software named R is described below (R: http://www.okada.jp.org/RWiki/?R%A4%C7%BF%F4%CD%FD%B7%D7%B2%E8%#h57b4eda)

If a 0-1 integer programming problem including objective function $$\max x+9y+3z$$

and constraint conditions $$x+2y+3z \leq 9$$

$$3x+2y+2z \leq 15$$

is solved,

```
f.obj = c(1,9,3)
f.con = matrix(c(1,2,3,3,2,2),nrow = 2,byrow = TRUE)
      [1][2][3]
  [1] 1 2 3
  [2] 3 2 2
f.dir = c("≤","≤")
f.rhs = c(9,15)
lp("max",f.obj,f.con,f.dir,f.rhs,all.bin = T)$solution
```

As a result, a vector of "1,1,1" is output, which indicates a solution of x=1, y=1, z=1.
In the meantime, if the same problem is solved as an integer programming problem,

```
f.obj = c(1,9,3)
f.con = matrix (c(1,2,3,3,2,2),nrow = 2,byrow = TRUE)
f.dir = c("≤","≤")
f.rhs = c(9,15)
lp("max",f.obj,f.con,f.dir,f.rhs,all.int = T)$solution
``` is given. As a result, a vector of "1,4,0" is output, which indicates a solution of x=1, y=4, z=0.

f.obj obtained by vectorizing a coefficient of the objective function, f.con obtained by putting a coefficient into a matrix in a constraint condition formula where a term including a design variable is moved to the left side, f.dir obtained by vectorizing an equality/inequality of a constraint condition formula, and f.rhs obtained by vectorizing a constant term of a constraint condition formula are generated and given to a function lp( ) as parameters as described above, whereby a solution to the design variables that optimize (maximize or minimize) the objective function can be obtained as a vector.

Figure 7:
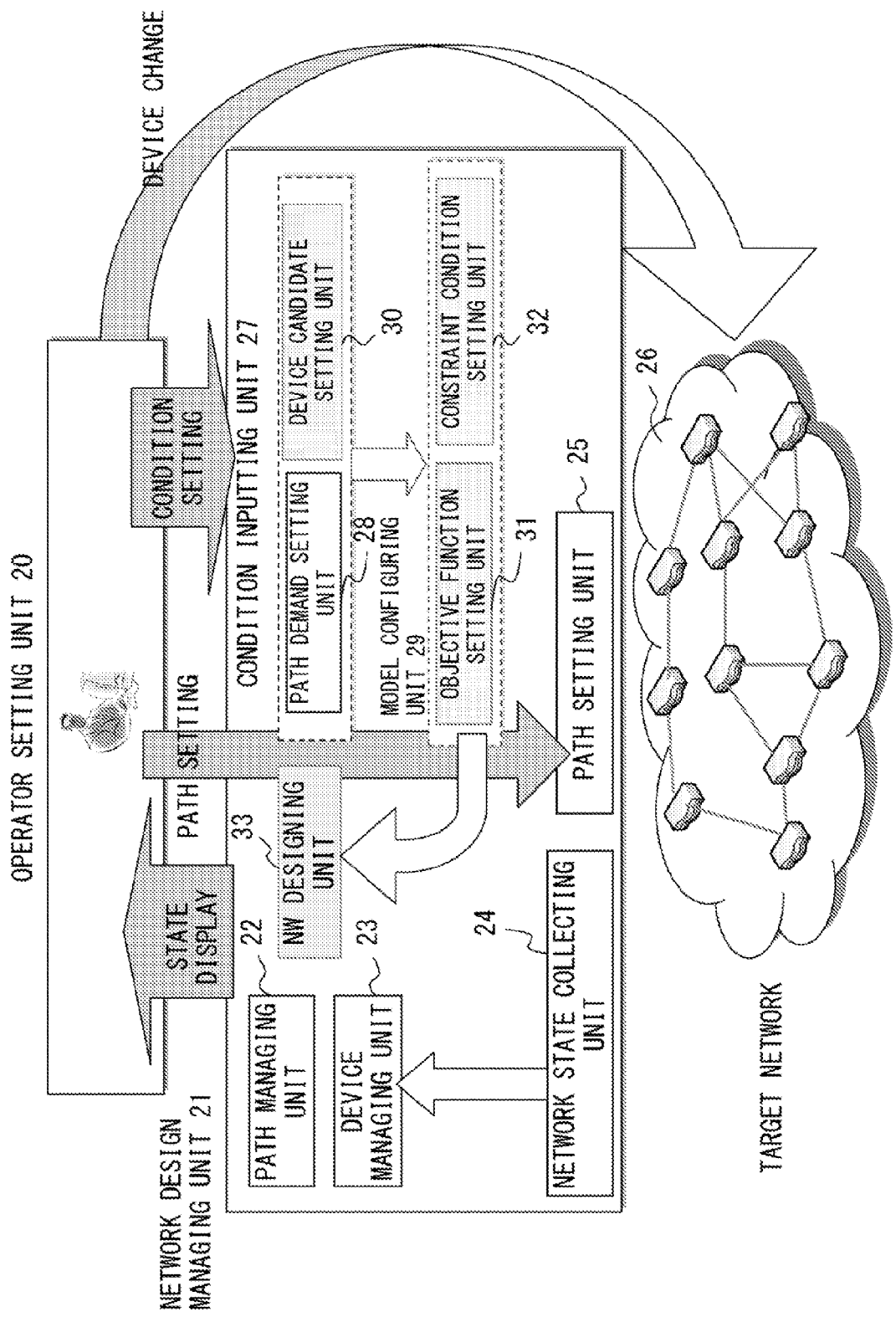
FIG. 7 illustrates a configuration of a network design system according to the embodiment.

FIG. 7 illustrates a system configuration of the network design system according to this embodiment.

An operator setting unit 20 provides an interface for receiving a display of a network state from a network design managing unit 21, configured to design and manage a state/configuration of a network, to an operator, for giving a device change instruction to a target network 26, or for giving a path setting instruction or a setting condition of a network device from the operator to the network design managing unit 21.

The network design managing unit 21 (a path managing unit 22 and a device managing unit 23) manages a state (path information and device information) of a network, derives an optimum network state/configuration according to a setting condition of a network device, which is given by the operator setting unit 20, and presents design results to the operator setting unit 20. Alternatively, the network design managing unit 21 automatically makes settings for an optimum path. A network state collecting unit 24 collects states of devices and paths in the network. The device managing unit 23 manages device information. The path managing unit 22 manages a route state of a path, and the volume of traffic.

A path setting unit 25 sets a route presented by the operator or automatically designed in a network 26. A condition inputting unit 27 sets a condition used when a network configuration is designed. A path demand setting unit 28 gives information of a path demand to be designed to a model configuring unit 29. A device candidate setting unit 30 gives information (cost, the number of ports, and the like) of a device that can be arranged in the network to the model configuring unit 29.

The model configuring unit 29 automatically configures a design model when a network configuration is designed. An objective function setting unit 31 formulates an objective function when the network configuration is designed. A constraint condition setting unit 32 formulates a constraint condition when the network configuration is designed. A NW (network) designing unit 33 computes an optimum path and a device selection based on a model formulated by the model configuring unit 29. For the NW designing unit 33, the above described solver for solving a mathematical programming problem is used.

According to this embodiment, a route/device selection/line (the number of ports), which minimize a device cost, can be automatically designed based on given device candidates in consideration of a relationship between the number of ports of each device and a cost (power or the amount of money).

Figure 8:
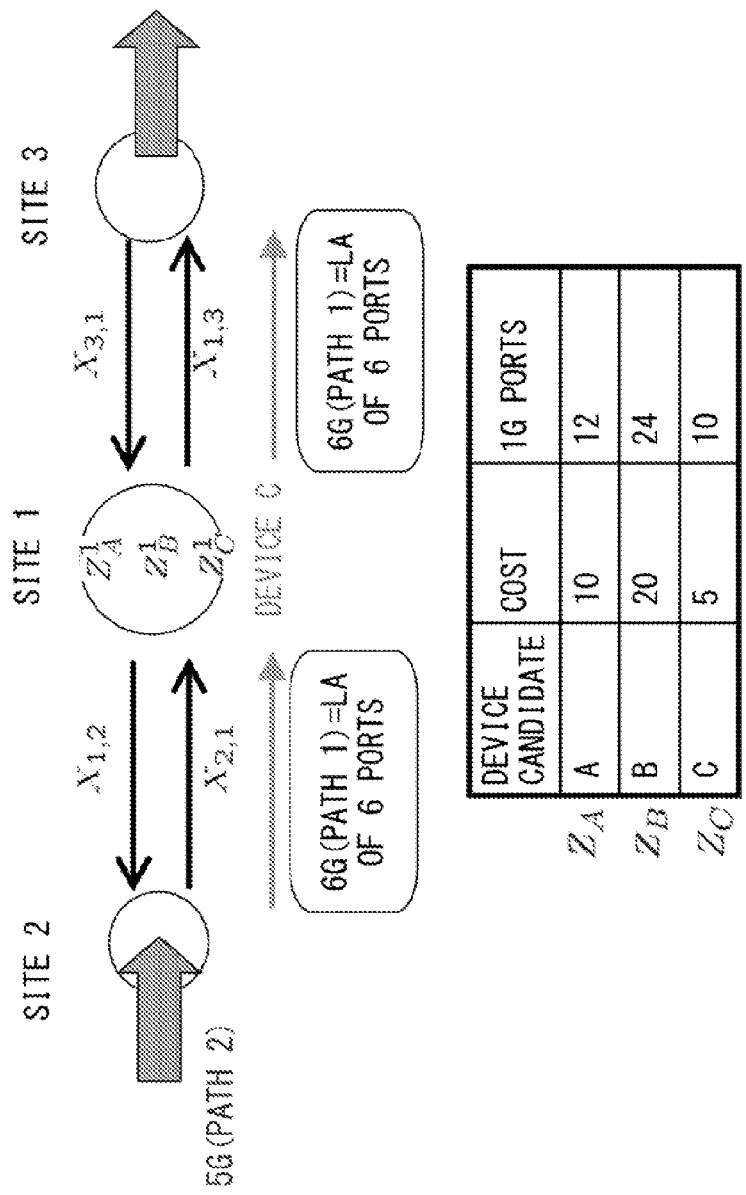
FIG. 8 is an explanatory view (No. 1) of a design method according to the embodiment.

FIGS. 8 to 10 are explanatory views of the design method according to this embodiment. In a topology where three sites are connected, a path 1 is designed to be accommodated from a site 2 to a site 1 to a site 3, and a device C is currently designed for the site 1.

Assume that a device selection and a route design are made when a path 2 (5 G) is additionally accommodated under this condition. Also assume that there are the following three types of devices that can be arranged in a network.

A device A has 12 1 G ports at cost 10.
A device B has 24 1 G ports at cost 20.
A device C has 10 1 G ports at cost 5.

Here, since the devices A, B and C can be arranged at the site 1, device design variables $Z^1_A$, $Z^1_B$ and $Z^1_C$, and link variables $X_{1,2}$, $X_{2,1}$, $X_{1,3}$, and $X_{3,1}$, which configure a route of the path 2, are defined.

For the convenience of explanation, device selections at the sites 2 and 3 are not included. In an actual design problem, however, device variables are respectively defined also for the sites.

This problem is formulated as illustrated in FIGS. 9 and 10.
The sum of costs of the arranged devices is minimized.

$$\min\{10Z^1_A + 20Z^1_B + 5Z^1_C + \delta X_{1,2} + \delta X_{2,1} + \delta X_{1,3} + \delta X_{3,1}\}$$

In the above described objective function, $Z^k_i = 0$ means that a device i is not arranged at a site k, and $Z^k_i = 1$ means that the device i is arranged at the site k. Moreover, $X_{i,j} = 1$ means that a link i→j is used, and $X_{i,j} = 0$ means that the link i→j is not used.

Here, δ is an empirically obtained small value. If an objective function that describes only a device cost is minimized as a mathematical programming problem, not only traffic that heads in one direction but traffic that heads in that direction after turning around is permitted. Accordingly, by providing δ, a link itself is given a small cost, which increases if the link turns around, and traffic that turns around is eliminated as a solution to the mathematical programming problem.

constraint conditions
flow conservation law
The volume of input traffic and the volume of output traffic at a node are equal.

$$X_{1,2} - X_{2,1} + X_{1,3} - X_{3,1} = 0$$

device port number constraint
The number of ports used to accommodate a path should not be smaller than the number of ports possessed by an arranged device.

$$0X_{1,2} + 5X_{2,1} + 5X_{1,3} + 0X_{3,1} \leq 12Z^1_A + 14Z^1_B + 10Z^1_C - 12$$

In the above provided constraint formula, a coefficient preceding $X_{1,2}$ is 0. This indicates an increase in the number of ports used when 5 G traffic is accommodated on a link $1 \rightarrow 2(X_{1,2})$. In this case, a 6 G link already exists on a link $2 \rightarrow 1$, which is assumed to include transmission paths in both directions including one direction and its reverse direction, and the 5 G traffic can be accommodated without increasing a link. Therefore, the number of ports does not increase and remains unchanged as 0. A coefficient preceding $X_{2,1}$ is 5. This indicates an increase in the number of ports used when the 5 G traffic is accommodated on a link $2 \rightarrow 1(X_{2,1})$. In this case, 6 G traffic is already accommodated on the link $2 \rightarrow 1$, which cannot accommodate traffic any more, and a link for newly accommodating the 5 G traffic is needed. A coefficient preceding $X_{1,3}$ is 5. This indicates an increase in the number of ports when the 5 G traffic is accommodated on a link $1 \rightarrow 3(X_{1,3})$. A coefficient preceding $X_{3,1}$ is 0. This indicates an increase in the number of ports used when the 5 G traffic is accommodated on a link $3 \rightarrow 1(X_{3,1})$.

A coefficient preceding $Z^1_A$ is 12. This indicates the number of ports of the device A. A coefficient preceding $Z^1_B$ is 24. This indicates the number of ports of the device B. A coefficient preceding $Z^1_C$ is 10. This indicates the number of ports of the device C. 12 that is subtracted last on the right side is the number of ports used on the path 1. Namely, a constraint formula of the number of ports of a device is represented as follows.

{The number of added port when the path 2 is accommodated} ≤ {the total number of ports when devices are selected} − {the number of ports used on the path 1} device selection constraint
The number of devices arranged at each site should be one or less.

$$Z^1_A + Z^1_B + Z^1_C \leq 1$$

The variable Z takes only 0 or 1. Therefore, the above provided device selection constraint formula indicates that only a case where any one of Z variables is 1 or all the Z variables are 0 is permitted.

Figure 11:
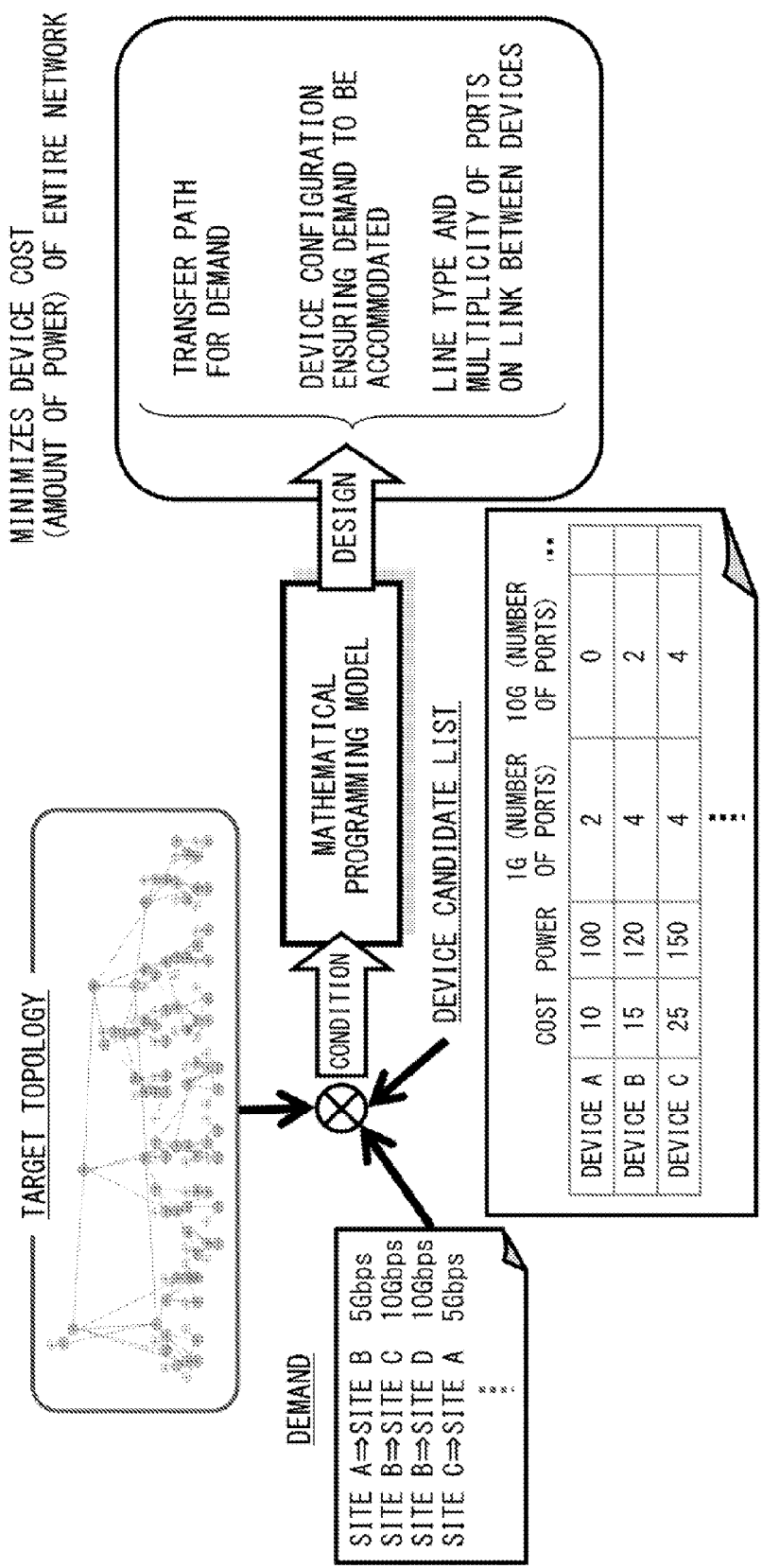
FIG. 11 is an explanatory view of a design method when a path/device selection and a line design are made in the embodiment.

FIGS. 11 and 12 are explanatory views of a design method according to this embodiment applied when a route/device selection and a line design are made.

Figure 13:
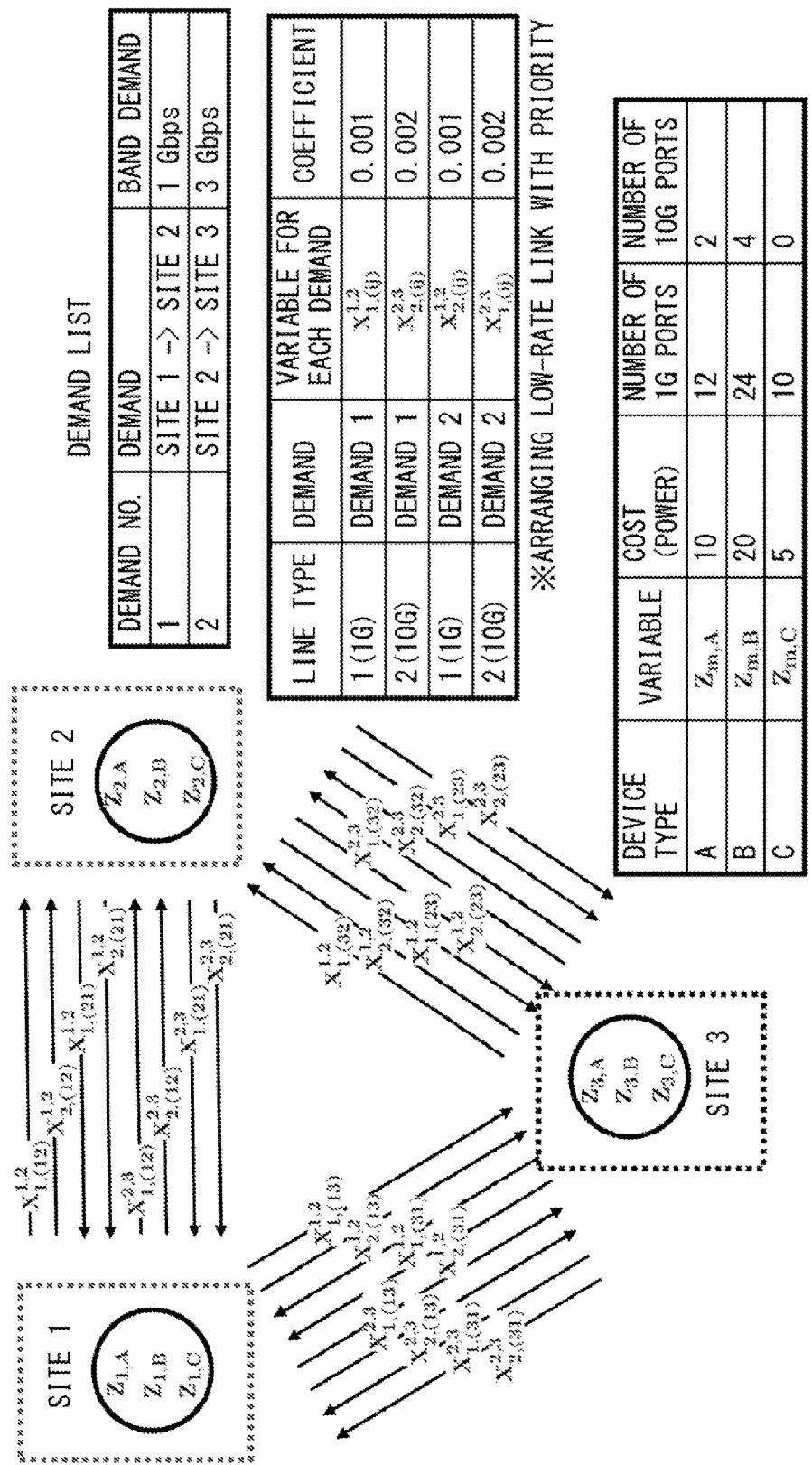
FIG. 13 is an explanatory view (No. 1) of a design method when a path/device selection and a line design are made in the embodiment and are solved as a global optimization problem.

FIGS. 13 and 14 are explanatory views of the design method used when the route/device selection and the line design are made is solved as a global optimization problem.

A transfer route, a selection of a device arranged at each site, and a line type of each link and a multiplicity of ports for each demand are simultaneously designed so that the cost is minimized under a condition that a connection relationship (target topology) among sites, a traffic demand list of each section, and devices (device candidate list) that can be arranged at each site are given.

This problem is defined in a directed graph G={V,E} (V is a set of points that represent sites, E is a set of edges that represent a link), which is represented with two logical links that respectively have directions for a physical link.

A design model for solving this problem is described below.

objective function
Accommodates all given demands, and minimizes a cost (the amount of power consumption) of devices arranged in an entire network.

$$\text{Minimize} \left\{ \sum_m \sum_k (C_{m,k} * Z_{m,k}) + \sum_{s,d} \sum_r \sum_{ij} \left( \delta_r * X^{(s,d)}_{r,(ij)} \right) \right\} \quad (1)$$

where
$C_{m,k}$:
is a cost (the amount of power consumption) of a device k that can be arranged at a site m.
Additionally,
$\delta_r$:
is a coefficient for avoiding a use of a wasteful link (turn-around of a route), and is a small coefficient given to a link in order to assign a priority to each line type r when a line is selected.

If no cost is given to a line (link) when a route heading from a site A to a site D via a site B is considered, a route that goes through the site B from the site A, turns around at the site C, goes back to the site B, and heads toward the site D can be possibly selected as illustrated in FIG. 13. However, by giving the small coefficient $\delta_r$ to the link as a cost as illustrated in FIG. 12, the route that turns around at the site C costs higher than a route that does not turn around at the site C. Therefore, such a path is automatically excluded when the objective function is minimized. The value of this small coefficient is empirically set.

design variables
$Z_{m,k} \in \{0,1\}$:
is a variable that represents whether or not to arrange the device k at the site m($\in V$).
Additionally,
$X_{r,(ij)}^{(s,d)} \in \{0,1\}$:
is a variable indicating whether or not a route goes through traffic of a (s,d) section demand of a (i→j) link of the line type r (two logical links each indicating a direction (i→j)/(j→i) between sites are defined for each type r).

FIG. 13 illustrates a setting example of the design variables. In this example, a device design variable $Z_{m,k}$ is given based on the assumption that three types (A, B and C) of devices can be arranged at each site. Moreover, two types such as a 1 G line (line type r=1) and a 10 G line (r=2) are assumed as links between sites, and a link design variable $X^{(s,d)}_{r,(ij)}$ is defined for all demands 1 and 2.

constraint conditions
flow conservation law: the volume of input traffic and the volume of output traffic at the site m are equal.

$$\sum_r \left( \sum_j X^{(s,d)}_{r,(ij)} - \sum_j X^{(s,d)}_{r,(ji)} \right) = \begin{cases} 1 & \forall (s,d), i = s \\ -1 & \forall (s,d), i = d \\ 0 & \forall (s,d), i \neq s, d \end{cases} \quad (2)$$

hop number constraint: an upper limit value of the number of hops for a demand $$\sum_r \sum_{ij} X_{r,(ij)}^{(s,d)} \leq H^{(s,d)} \quad \forall (s, d) \qquad (5)$$

where
$H^{(s,d)}$:
is the upper limit value of the number of hops for a (s,d) section demand.

device selection constraint: the number of devices selected at the site m is one or less.

$$\sum_k Z_{m,k} \leq 1 \quad \forall m \qquad (3)$$

device port number constraint: the number of ports used for a traffic transfer should be equal to or smaller than the number of ports included in each device.

$$\sum_j U_r\left(\max\left[\sum_{(s,d)} B^{(s,d)} X_{r,(mj)}^{(s,d)}, \sum_{(s,d)} B^{(s,d)} X_{r,(jm)}^{(s,d)}\right]\right) \leq \qquad (4)$$

$$\sum_k p_{r,k} Z_{m,k} - E_{r,m} \quad \forall r, m$$

where
$B^{(s,d)}$:
is a band demand for the (s,d) section demand.

$$U_r() : U_r(a) = \text{ceil}\left(\frac{a}{LinkRateperPort}\right)$$

is a function to calculate the number of ports used for the line type r by using a link traffic volume having a larger transfer volume among links in both directions. A function ceil(x) is a function to give an integer that is not smaller than x and is minimum.

$p_{r,k}$
is the number of ports of the line type r included in the device k.

$E_{r,m}$
is the number of ports of the line type r used as
Source/Destination of traffic at the site m.

link aggregation number constraint: limits the number of ports multiplexed for each link to a specified number or less.

$$\sum_r U_r\left(\max\left[\sum_{(s,d)} B^{(s,d)} X_{r,(ij)}^{(s,d)}, \sum_{(s,d)} B^{(s,d)} X_{r,(ji)}^{(s,d)}\right]\right) \leq LA_{r,\{i,j\}} \qquad (5)$$

$$\forall r, (i, j) \in E$$

where
$LA_{r,(i,j)}$
is the number of ports, which can be multiplexed, of the line type r on a link between sites (i,j).

The problem formulated as described above is summarized as follows. Moreover, definitions of the following formulas and variables are summarized in FIG. 14.

Minimize $$\sum_m \sum_k (C_{m,k} * Z_{m,k}) + \sum_{s,d} \sum_r \sum_{ij} \left(\delta_r * X_{r,(ij)}^{(s,d)}\right) \qquad (1)$$

subject to $$\sum_r \left(\sum_j X_{r,(ij)}^{(s,d)} - \sum_j X_{r,(ji)}^{(s,d)}\right) = \begin{cases} 1 & \forall (s, d), i = s \\ -1 & \forall (s, d), i = d \\ 1 & \forall (s, d), i \neq s, d \end{cases} \qquad (2)$$

$$\sum_r \sum_{ij} X_{r,(ij)}^{(s,d)} \leq H^{(s,d)} \quad \forall (s, d)$$

$$\sum_k Z_{m,k} \leq 1 \quad \forall m \qquad (3)$$

$$\sum_j U_r\left(\max\left[\sum_{(s,d)} B^{(s,d)} X_{r,(mj)}^{(s,d)}, \sum_{(s,d)} B^{(s,d)} X_{r,(jm)}^{(s,d)}\right]\right) \leq \sum_k p_{r,k} Z_{m,k} - E_{r,m} \qquad (4)$$

$$\forall r, m$$

$$\sum_r U_r\left(\max\left[\sum_{(s,d)} B^{(s,d)} X_{r,(ij)}^{(s,d)}, \sum_{(s,d)} B^{(s,d)} X_{r,(ji)}^{(s,d)}\right]\right) \leq LA_{r,\{i,j\}} \qquad (5)$$

$$\forall r, (i, j) \in E$$

FIGS. 15 to 18 illustrate a method implemented by adopting an incremental approach in the route/device selection and line design method according to the embodiment illustrated in FIG. 11.

The global optimization problem described with reference to FIGS. 13 and 14 needs a large amount of computation for a design process due to large variable sizes. Especially, the size of the link variable $X_{ij}$ defined for each demand becomes large in an actual network.

To reduce the amount of computation to a realistic amount, a method implemented not by defining link variables for all demands and designing routes for all the demands at one time but by defining a link variable common to demands and designing the demands to be accommodated one by one is effective.

It is known that the incremental approach for designing each demand to be accommodated in this way can derive a local optimum solution (approximate solution) although there is a possibility that a globally optimum design solution cannot be derived depending on the order of demands to be accommodated. Moreover, this approach is an approach available as a network design method owing to its applicability to an expansion design made when a new service (demand) is accommodated.

A method of sequentially designing a transfer route, a selection of a device arranged at each location and a line type for each demand so that a cost (the amount of power consumption) is minimized under a condition that a connection relationship (target topology) among sites, a list of demands between sites, devices that can be arranged at each site (device candidate list) are given is described as an incremental approach. Similarly to the case illustrated in FIGS. 13 and 14, this problem can be defined in a directed graph G={V,E}, and constraint conditions can be handled as a linear format having design variables of {0,1}. Therefore, this problem can be reduced to a 0-1 integer programming problem and can be solved.

The following description refers to a design model including a device selection. However, by setting a condition of arranging only one device at each site m, this problem can be used also as a route and line design problem under the condition where a device is fixed.

objective function

Minimizes a cost (power) of a device to be arranged in a network when a traffic demand for a particular s(Source)-d (Destination) is additionally accommodated.

$$\text{Minimize} \left\{ \sum_m \sum_k (C_{m,k} * Z_{m,k}) + \sum_r \sum_{ij} (\delta_r * X_{r,(ij)}) \right\} \quad (6)$$

where $C_{m,k}$:
is the cost (the amount of power consumption) of the device k that can be arranged at the site m.

$\delta_r$:
is a coefficient for avoiding a use of a wasteful link (turn-around of a route) (as described with reference to FIG. 12), and is a small coefficient given to a link in order to assign a priority to each line type r when a line is selected.

design variables $Z_{m,k} \in \{0,1\}$:
is a variable that indicates whether or not the device k is arranged at the site $m(\in V)$.

$X_{r,(ij)} \in \{0,1\}$:
is a variable that indicates whether or not a route goes through traffic of each demand of the (i→j) link of the line type r (two logical links each indicating a direction (i→j)/(j→i) are defined for each line type r).

Figure 15:
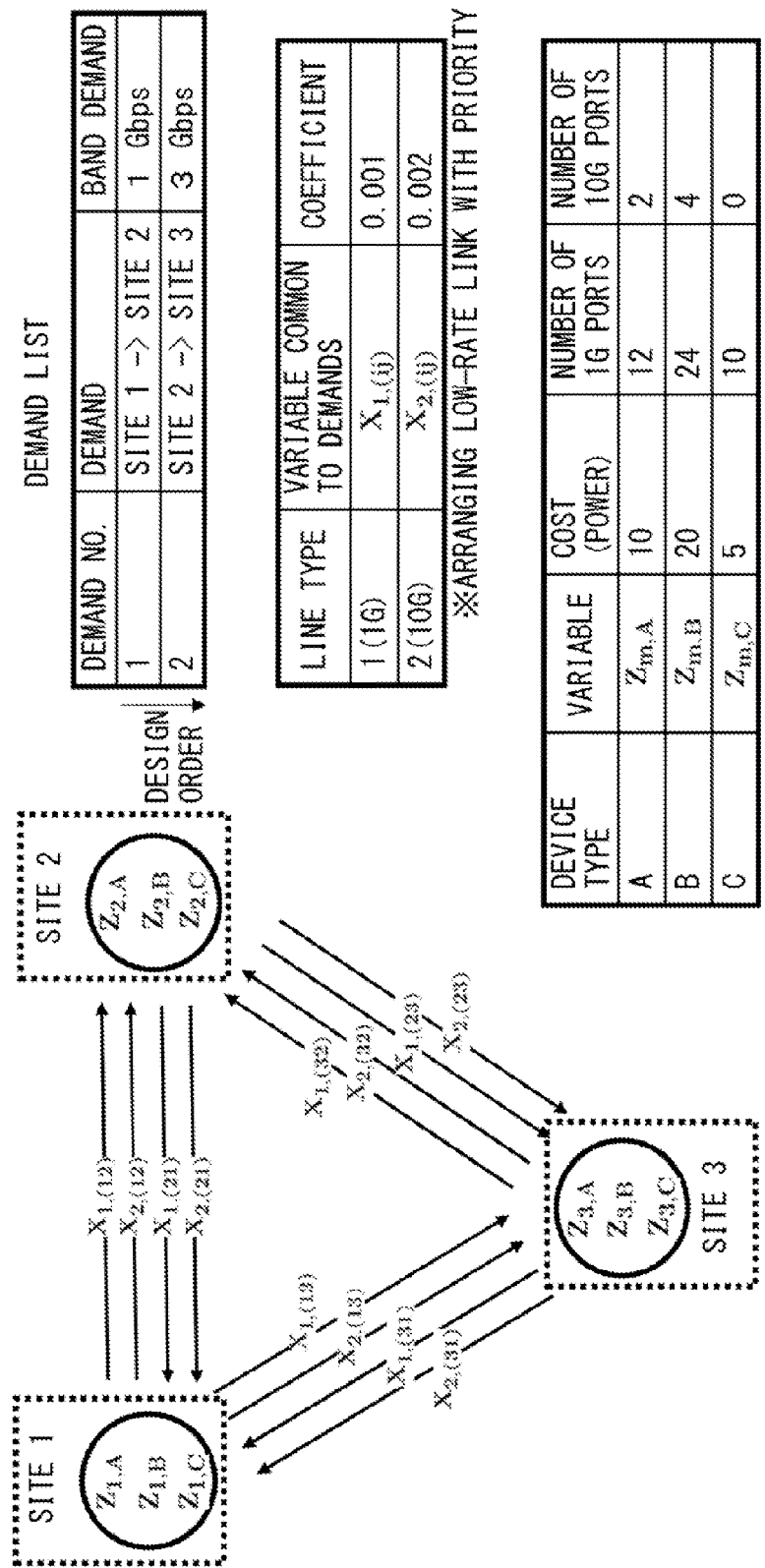
FIG. 15 is a schematic (No. 1) illustrating a method implemented by adopting an incremental approach in the path/device selection and line design method according to the embodiment.

FIG. 15 illustrates a setting example of the above described design variables. This example assumes that three types (A, B and C) of devices can be arranged at each site, and a device design variable $Z_{m,k}$ is given. Moreover, two types of links such as a 1 G line (line type r=1) and a 10 G line (r=2) are assumed as links between sites, and a link design variable $X_{r,(ij)}$ common to demands is defined.

constraint conditions flow conservation law: the volume of input traffic and the volume of output traffic at the site m are equal.

$$\sum_r \left( \sum_j X_{r,(ij)} - \sum_j X_{r,(ji)} \right) = \begin{cases} 1 & \forall i = s \\ -1 & \forall i = d \\ 1 & \forall i \neq s, d \end{cases} \quad (7)$$

hop number constraint $$\sum_r \sum_{ij} X_{r,(ij)} \leq H \quad$$

where

H:
is an upper limit value of the number of hops for a design demand.

device selection constraint: the number of devices selected at the site m is one or less.

$$\sum_k Z_{m,k} \leq 1 \quad \forall m \quad (8)$$

device port number constraint: the number of ports used to transfer traffic should be equal to or less than the number of ports included in each device.

$$\sum_j \{(U_r(\max[(B + R_{mj}), R_{jm}]) - u^r_{m,j})X_{r,(mj)} - \quad (9)$$

$$\sum_{q \neq r} \{u^r_{m,j} X_{q,(m,j)}\} + (U_r(\max[(B + R_{jm}), R_{mj}]) - u^r_{j,m})X_{r,(jm)} -$$

$$\sum \{u^r_{j,m} X_{q,(jm)}\} + u^r_{m,j}\} \leq \sum_k p_{r,k} Z_{m,k} - E_{r,m} \quad \forall r, m$$

where terms
$-\Sigma_{q \neq r}\{u^r_{m,j} X_{q,(mj)}\}$
and
$-\Sigma_{q \neq r}\{u^r_{j,m} X_{q,(jm)}\}$
mean that a port of the line type r is not used any more if a line type q different from the line type r at the current time point is selected on a link between the respectively identical sites.

B:
is a band demand for a demand to be designed.

$R_{ij}$:
is the volume of traffic already transferred on the (i→j) link.

$u^r_{ij}$:
indicates the number of ports of the line type r, which are already used on the physical link between the sites (i-j)

$$U_r(): U_r(a) = \text{ceil}\left(\frac{a}{LinkRateperPort}\right)$$

is a function to calculate the number of used ports of the line type r by using the link traffic volume having a larger transfer amount of links in both directions. The function ceil (x) is the same function as the above described one.

$p_{r,k}$:
is the number of ports of the line type r, which are included in the device k.

$E_{r,m}$:
is the number of ports of the line type r, which are used as Source/Destination of traffic at the site m.

link aggregation number constraint: limits the number of ports multiplexed for each link to a specified value or less.

$$\sum_r U_r(\max[B + R^r_{ij}, R^r_{ji}])X_{r,(ij)} \leq LA_{r,[i,j]} \quad (10)$$

$$\forall (i, j) \in E$$

where $LA_{r,(i,j)}$:
indicates the number of ports, which can be multiplexed, of the line type r for the link between the sites (i,j).

The formulas set with the above described method are summarized below. Definitions of the formulas and variables are summarized in FIG. 16.

Minimize $$\sum_m \sum_k (C_{m,k} * Z_{m,k}) + \sum_r \sum_{ij} (\delta_r * X_{r,(ij)}) \quad (6)$$

subject to

-continued $$\sum_r \left( \sum_j X_{r,(ij)} - \sum_j X_{r,(ji)} \right) = \begin{cases} 1 & \forall i = s \\ -1 & \forall i = d \\ 1 & \forall i \neq s, d \end{cases} \quad (7)$$

$$\sum_r \sum_{ij} X_{r,(ij)} = H$$

$$\sum_k Z_{m,k} \leq 1 \quad \forall m \quad (8)$$

$$\sum_j \{(U_r(\max[(B + R_{mj}), R_{jm}]) - u^r_{m,j}) X_{r,(mj)} - \quad (9)$$

$$\sum_{q \neq r} \{u^r_{m,j} X_{q,(m,j)}\} + (U_r(\max[(B + R_{jm}), R_{mj}]) - u^r_{j,m}) X_{r,(jm)} -$$

$$\sum \{u^r_{j,m} X_{q,(jm)}\} + u^r_{m,j}\} \leq \sum_k p_{r,k} Z_{m,k} - E_{r,m} \quad \forall r, m$$

$$\sum_r U_r(\max[B + R^r_{ij}, R^r_{ji}]) X_{r,(ij)} \leq LA_{r,(i,j)} \quad (10)$$

$$\forall (i, j) \in E$$

Design Example

Figure 17:
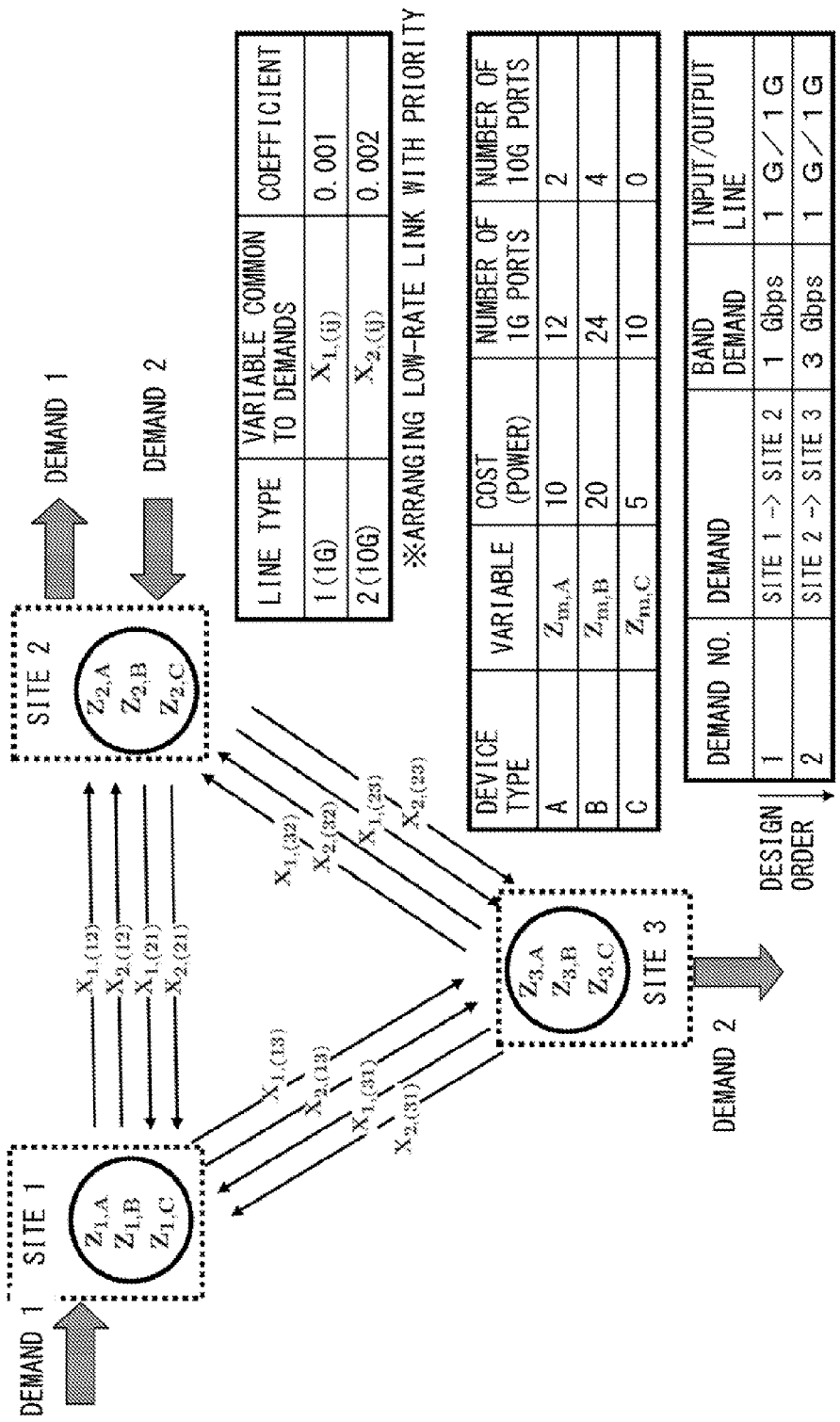
FIG. 17 is a schematic (No. 3) illustrating the method implemented by adopting the incremental approach in the path/device selection and line design method according to the embodiment.

An example of sequentially designing the demands 1 and 2 for a design problem illustrated in FIG. 17 is described below.

Here, assume that there are three types (A, B and C) of device candidates that can be arranged at each site. Also assume that two types such as a 1 G line (line type r=1) and a 10 G line (r=2) are used as line types and a link aggregation is not performed ($LA_{r,(i,j)}=1$).

1. Design Model for Accommodating the Demand 1 (the Site 1 to the Site 2)

For the demand 1, a case where traffic flows in with a 1 G port of the device arranged at the site 1 and flows out with a 1 G port of the device at the site 2 is considered.

Minimize $10Z_{1,A} + 20Z_{1,B} + 5Z_{1,C} + 10Z_{2,A} + 20Z_{2,B} + 5Z_{2,C} + 10Z_{3,A} + 20Z_{3,B} +$ $5Z_{3,C} + 0.001X_{1,(1,2)} + 0.001X_{1,(2,1)} + 0001X_{1,(1,3)} + 0.001X_{1,(3,1)} +$ $0.001X_{1,(2,3)} + 0.001X_{1,(3,2)} + 0.002X_{2,(1,2)} + 0.002X_{2,(2,1)} +$ $0.002X_{2,(1,3)} + 0.002X_{2,(3,1)} + 0.002X_{2,(2,3)} + 0.002X_{2,(3,2)}$ subject to $X_{1,(12)} + X_{1,(13)} - X_{1,(21)} -$ $X_{1,(21)} + X_{2,(12)} + X_{2,(13)} - X_{2,(21)} - X_{2,(21)} = 1$ $X_{1,(21)} + X_{1,(23)} - X_{1,(12)} - X_{1,(32)} + X_{2,(21)} + X_{2,(23)}) - X_{2,(12)} - X_{2,(32)} = -1$ $X_{1,(31)} + X_{1,(32)} - X_{1,(13)} - X_{1,(23)} + X_{2,(31)} + X_{2,(32)} - X_{2,(13)} - X_{2,(23)} = 0$ $Z_{1,A} + Z_{1,B} + Z_{1,C} \leq 1$ $Z_{2,A} + Z_{2,B} + Z_{2,C} \leq 1$ $Z_{3,A} + Z_{3,B} + Z_{3,C} \leq 1$ $((U_1(1) - U_1(0))X_{1,(12)} - U_1(0)X_{2,(12)}) +$ $((U_1(1) - U_1(0))X_{1,(21)} - U_1(0)X_{2,(21)}) + U_1(0) + ((U_1(0))X_{1,(13)}) +$ $((U_1(1) - U_1(0))X_{1,(31)} - U_1(0)X_{2,(31)}) + U_1(0) \leq$ $12Z_{1,A} + 24Z_{1,B} + 10Z_{1,C} - 1$ $((U_2(1) - U_2(0))X_{2,(12)} - U_2(0)X_{1,(12)}) +$ $((U_2(1) - U_2(0))X_{2,(21)} - U_2(0)X_{1,(21)}) +$ $U_2(0) + ((U_2(1) - U_2(0))X_{2,(13)} - U_2(0)X_{1,(13)}) +$ $((U_2(1) - U_2(0))X_{2,(31)} - U_2(0)X_{1,(31)}) + U_2(0) \leq 2Z_{1,A} + 4Z_{1,B} + 0Z_{1,C}$ $((U_1(1) - U_1(0))X_{1,(21)} - U_1(0)X_{2,(21)}) +$ $((U_1(1) - U_1(0))X_{1,(12)} - U_2(0)X_{1,(12)}) +$ $U_1(0) + ((U_1(1) - U_1(0))X_{1,(23)} - U_2(0)X_{1,(13)}) +$ $((U_1(1) - U_1(0))X_{1,(32)} - U_1(0)X_{2,(32)}) + U_1(0) \leq$ $12Z_{2,A} + 24Z_{2,B} + 10Z_{2,C} - 1$ $((U_2(1) - U_2(0))X_{2,(21)} - U_2(0)X_{1,(21)}) + ((U_2(1) - U_2)(0))X_{2,(12)} -$ $U_2(0)X_{1,(12)} + ((U_2(1) - U_2(0))X_{2,(12)} - U_2(0)X_{1,(12)}) +$ $U_2(0) + ((U_2(1) - U_2(0))X_{2,(23)} - U_2(0)X_{1,(23)}) +$ $((U_2(1) - U_2(0))X_{2,(32)} - U_2(0)X_{1,(32)}) + U_2(0) \leq 2Z_{2,A} + 4Z_{2,B} + 0Z_{2,C}$ $((U_1(1) - U_1(0))X_{1,(31)} - U_1(0)X_{2,(31)}) +$ $((U_1(1) - U_1(0))X_{1,(13)} - U_2(0)X_{1,(13)}) +$ $U_1(0) + ((U_1(1) - U_1(0))X_{1,(32)} - U_2(0)X_{1,(32)}) +$ $((U_1(1) - U_1(0))X_{1,(23)} - U_1(0)X_{2,(23)}) + U_1(0) \leq$ $12Z_{3,A} + 24Z_{3,B} + 10Z_{3,C}$ $((U_2(1) - U_2(0))X_{2,(31)} - U_2(0)X_{1,(31)}) +$ $((U_2(1) - U_2(0))X_{2,(13)} - U_2(0)X_{1,(13)}) +$ $U_2(0) + ((U_2(1) - U_2(0))X_{2,(32)} - U_2(0)X_{1,(32)}) +$ $((U_2(1) - U_2(0))X_{2,(23)} - U_2(0)X_{1,(23)}) + U_2(0) \leq 2Z_{3,A} + 4Z_{3,B} + 0Z_{3,C}$ $U_1(1)X_{1,(12)} + U_2(1)X_{2,(12)} \leq 1$ $U_1(1)X_{1,(13)} + U_2(1)X_{2,(13)} \leq 1$ $U_1(1)X_{1,(21)} + U_2(1)X_{2,(21)} \leq 1$ $U_1(1)X_{1,(23)} + U_2(1)X_{2,(23)} \leq 1$ $U_1(1)X_{1,(31)} + U_2(1)X_{2,(31)} \leq 1$ $U_1(1)X_{2,(32)} + U_2(1)X_{2,(32)} \leq 1$ where $U_1(\ )$ is a function to obtain the number of ports by assuming the 1 G line, and $U_2(\ )$ is a function to obtain the number of ports by assuming the 10 G line. Accordingly, for example, coefficients $U_1(2)=2$, $U_2(2)=1$ are obtained.

design solution to the demand 1.

By computing the above described formulas with the aforementioned solver (R(lp_solve)), a result of "$X_{1,(12)}=1$, $Z_{1,c}=1$, $Z_{2,c}=1$, the other design variables=0" is obtained. Namely, the device C is selected for the sites 1 and 2, and a route via the 1 G line between the sites 1 and 2 is designed for the demand 1.

Example of a Data Structure when the Solver R (lp_solve) is Applied

FIG. 18 illustrates an image of a data structure when the above described model is applied to R(lp_solve). Within the solver, coefficients of input data are predetermined to respectively correspond to coefficients of variables based on their ordinal positions. Accordingly, when the solver is used, data having a structure where values of coefficients are arranged in order is generated by making the predetermined coefficients correspond to a formula of a problem based on their ordinal positions. By inputting the generated data, a formula to which the coefficients are given is generated within the solver, and a solution is obtained according to an internal algorithm. To f.dir, an equality or inequality is input. Also an equality or inequality is predetermined to correspond to an equivalent in a corresponding formula based on an ordinal position of a sequence. A sequence of 0 and 1 is obtained as an output of the solver to a 0-1 integer programming problem. 0 or 1 is given as a value of a corresponding variable based on its ordinal position, and a solution is obtained in order where coefficients of a problem to be solved when input data is generated are made to correspond to positions of the sequence. Also in a process for designing another demand to be accommodated, a computation using the solver is performed in a similar data structure.

2. Design Model for Accommodating the Demand 2 (the Site 2 to the Site 3)

A problem of accommodating the demand 2 in this state is described next. The demand 2 is a 3-Gbps demand. A case where traffic flows in with one 10 G port of the device arranged at the site 2 and flows out with one 10 G port at the site 3 is considered (FIG. 15).

Minimize $$10Z_{1,A} + 20Z_{1,B} + 5Z_{1,C} + 10Z_{2,A} + 20Z_{2,B} + 5Z_{2,C} + 10Z_{3,A} + 20Z_{3,B} +$$
$$5Z_{3,C} + 0.001X_{1,(1,2)} + 0.001X_{1,(2,1)} + 0001X_{1,(1,3)} + 0.001X_{1,(3,1)} +$$
$$0.001X_{1,(2,3)} + 0.001X_{1,(3,2)} + 0.002X_{2,(1,2)} + 0.002X_{2,(2,1)} +$$
$$0.002X_{2,(1,3)} + 0.002X_{2,(3,1)} + 0.002X_{2,(2,3)} + 0.002X_{2,(3,2)}$$

subject to $$X_{1,(12)} + X_{1,(13)} - X_{1,(21)} -$$
$$X_{1,(21)} + X_{2,(12)} + X_{2,(13)} - X_{2,(21)} - X_{2,(21)} = 0$$
$$X_{1,(21)} + X_{1,(23)} - X_{1,(12)} - X_{1,(32)} + X_{2,(21)} + X_{2,(23)}) - X_{2,(12)} - X_{2,(32)} = 1$$
$$X_{1,(31)} + X_{1,(32)} - X_{1,(13)} - X_{1,(23)} + X_{2,(31)} + X_{2,(32)} - X_{2,(13)} - X_{2,(23)} = -1$$
$$Z_{1,A} + Z_{1,B} + Z_{1,C} \le 1$$
$$Z_{2,A} + Z_{2,B} + Z_{2,C} \le 1$$
$$Z_{3,A} + Z_{3,B} + Z_{3,C} \le 1$$
$$((U_1(4) - U_1(1))X_{1,(12)} - U_1(1)X_{2,(12)}) +$$
$$((U_1(3) - U_1(1))X_{1,(21)} - U_1(1)X_{2,(21)}) +$$
$$U_1(1) + ((U_1(3) - U_1(0))X_{1,(13)} - U_1(0)X_{2,(13)}) +$$
$$((U_1(3) - U_1(0))X_{1,(31)} - U_1(0)X_{2,(31)}) + U_1(0) \le$$
$$12Z_{1,A} + 24Z_{1,B} + 10Z_{1,C} - 1$$
$$((U_2(3) - U_2(0))X_{2,(12)} - U_2(0)X_{1,(12)}) +$$
$$((U_2(2) - U_2(0))X_{2,(21)} - U_2(0)X_{1,(21)}) +$$
$$U_2(0) + ((U_2(3) - U_2(0))X_{2,(13)} - U_2(0)X_{1,(13)}) +$$
$$((U_2(3) - U_2(0))X_{2,(31)} - U_2(0)X_{1,(31)}) + U_2(0) \le 2Z_{1,A} + 4Z_{1,B} + 0Z_{1,C}$$
$$((U_1(3) - U_1(1))X_{1,(21)} - U_1(1)X_{2,(21)}) +$$
$$((U_1(4) - U_1(1))X_{1,(12)} - U_1(1)X_{2,(12)}) +$$
$$U_1(1) + ((U_1(3) - U_1(0))X_{1,(23)} - U_1(0)X_{2,(23)}) +$$
$$((U_1(1) - U_1(0))X_{1,(32)} - U_1(0)X_{2,(32)}) + U_1(0) \le$$
$$12Z_{2,A} + 24Z_{2,B} + 10Z_{2,C} - 4$$
$$((U_2(3) - U_2(0))X_{2,(21)} - U_2(0)X_{1,(21)}) +$$
$$((U_2(3) - U_2(0))X_{2,(12)} - U_2(0)X_{1,(12)}) +$$
$$U_2(0) + ((U_2(3) - U_2(0))X_{2,(23)} - U_2(0)X_{1,(23)}) +$$
$$((U_2(3) - U_2(0))X_{2,(13)} - U_2(0)X_{1,(13)}) + U_2(0) \le 2Z_{2,A} + 4Z_{2,B} + 0Z_{2,C}$$
$$((U_1(3) - U_1(0))X_{1,(31)} - U_1(0)X_{2,(31)}) +$$
$$((U_1(3) - U_1(0))X_{1,(13)} - U_2(0)X_{1,(13)}) +$$
$$U_1(0) + ((U_1(3) - U_1(0))X_{1,(32)} - U_2(0)X_{1,(32)}) +$$
$$((U_1(3) - U_1(0))X_{1,(23)} - U_1(0)X_{2,(23)}) + U_1(0) \le$$
$$12Z_{3,A} + 24Z_{3,B} + 10Z_{3,C} - 3$$
$$((U_2(3) - U_2(0))X_{2,(31)} - U_2(0)X_{1,(31)}) +$$
$$((U_2(3) - U_2(0))X_{2,(13)} - U_2(0)X_{1,(13)}) + U_2(0) +$$
$$((U_2(3) - U_2(0))X_{2,(32)} - U_2(0)X_{1,(32)} + ((U_2(3) - U_2(0))X_{2,(23)} -$$
$$U_2(0)X_{1,(23)}) + U_2(0) \le 2Z_{3,A} + 4Z_{3,B} + 0Z_{3,C}$$
$$U_1(4)X_{1,(12)} + U_2(3)X_{2,(12)} \le 1$$
$$U_1(3)X_{1,(13)} + U_2(3)X_{2,(13)} \le 1$$
$$U_1(3)X_{1,(21)} + U_2(3)X_{2,(21)} \le 1$$
$$U_1(3)X_{1,(23)} + U_2(3)X_{2,(23)} \le 1$$
$$U_1(3)X_{1,(31)} + U_2(3)X_{2,(31)} \le 1$$
$$U_1(3)X_{2,(32)} + U_2(3)X_{2,(32)} \le 1$$

Design Solution to the Demand 2

A computation using the solver results in "$X_{2,(23)}=1$, $Z_{1,C}=1$, $Z_{2,A}=1$, $Z_{3,A}=1$, the other design variables=0". Namely, the device C is selected for the site 1, the device A that supports 10 G ports is selected as an upgrade for the site 2, and the device A is selected for the site 3. Moreover, for the demand 2, a route that goes through the 10 G line between the sites 2 and 3 is designed.

Because the above described design condition is set not to permit a link aggregation, results are obtained such that a transfer route using the 10 G line is designed to accommodate the 3 G demand and a device that supports the 10 G line is selected to accommodate the 3 G demand.

Note that a design can be made in consideration of not only the above described device cost but a line facility cost. In this case, a link cost may be given in addition to the above described δ.

Additionally, also a route/line design when a device arrangement at each site is explicitly given can be made. In this case, the number of device candidates set at each site may be limited to 1.

FIGS. 19 to 23 are explanatory views of a line/device design method used when a traffic state is explicitly given.

In the optimum network design problem described with reference to FIGS. 11 to 18, a transfer route, a device selection and a line design are comprehensively performed for a demand. Depending on an operator, however, he or she sometimes desires to explicitly specify a traffic transfer route. Accordingly, FIGS. 19 to 23 illustrate a method of configuring a design model for performing a device selection and a line design, which minimize a cost, under a condition that a transfer state of traffic flowing in a network is specified, and of determining a selection of a device arranged at each site and a line type at a minimum cost under a condition that a connection relationship (target topology) among sites, a traffic transfer route between sites, and devices that can be arranged at each site (device candidate list) are given.

This problem is defined in an undirected graph G={V,E} that represents a connection relationship of a physical link. Moreover, an objective function and constraint conditions can be handled as a linear format having {0,1} variables. Therefore, this problem can be reduced to a 0-1 integer programming problem and solved. Unlike the above described design model, the link variable $X_{ij}$ that is defined in both directions in order to identify a route becomes unnecessary, so that a significant reduction in the scale of the problem can be expected.

objective function

Minimizes a cost (power) of a device to be arranged in a network in order to ensure a given traffic transfer state to be accommodated.

$$\text{Minimize} \left\{ \sum_m \sum_k (C_{m,k} * Z_{m,k}) + \sum_r \sum_{ij} (\delta_r * L_{r,(ij)}) \right\} \quad (11)$$

where $C_{m,k}$:
is the cost (the amount of power consumption) of the device k that can be arranged at the site m.

$\delta_r$:
is a small coefficient given to a link in order to assign a priority to each line type r when a line is selected.

design variables $Z_{m,k} \in \{0,1\}$:
is a variable that indicates whether or not the device k is arranged at the site m($\in V$).

$L_{r,(i,j)} \in \{0,1\}$:
is a variable that indicates whether or not a link of the line type r defined between (i,j)$\in$E is used.

Figure 19:
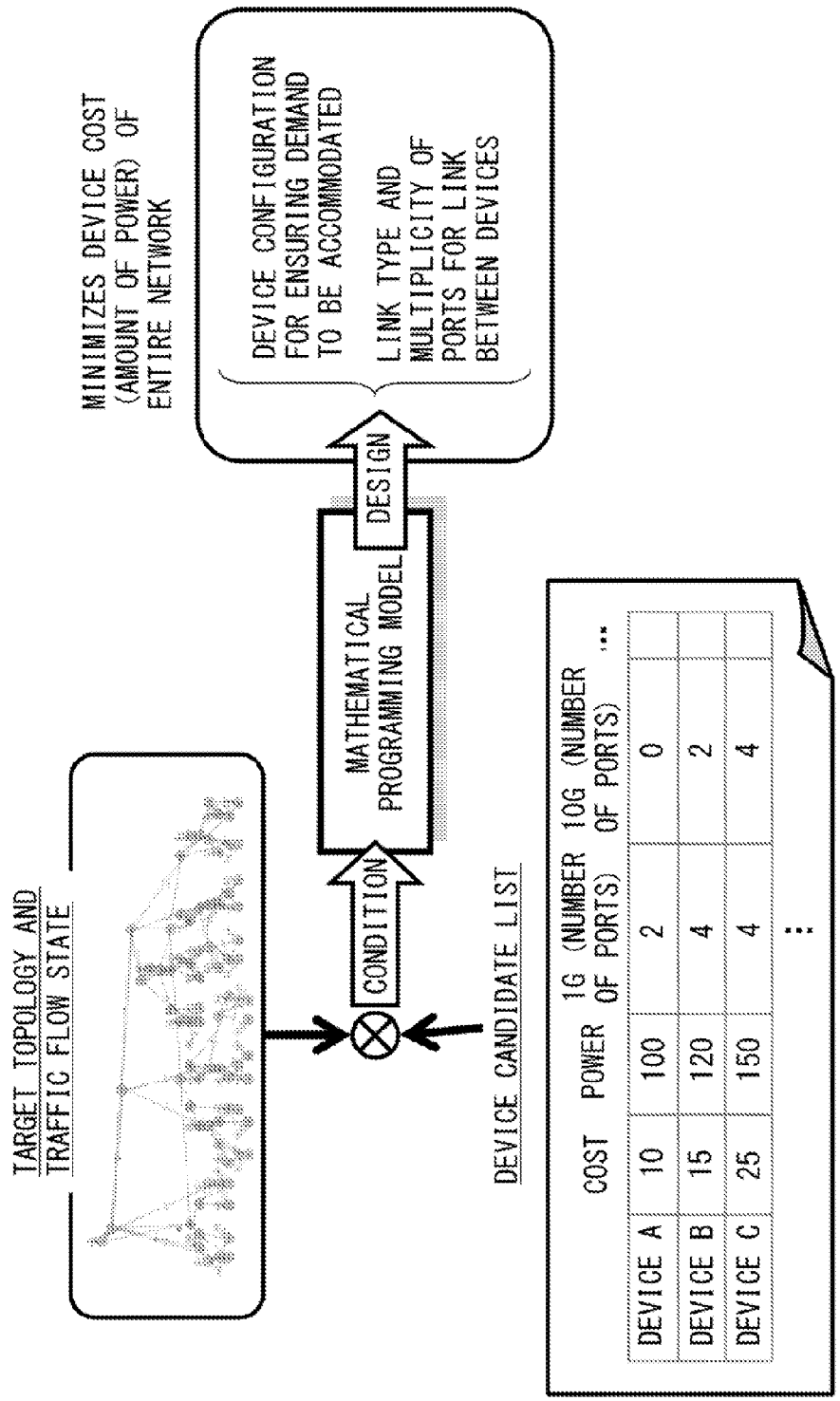
FIG. 19 is an explanatory view (No. 1) of the line/device design method when the traffic state is explicitly given.

FIG. 19 illustrates a setting example of the above described design variables. This example assumes that three types (A, B and C) of devices can be arranged at each site, and a device design variable $Z_{m,k}$ is given. Moreover, for a link between sites, two types such as a 1 G line (line type r=1) and a 10 G line (r=2) are assumed, and an undirected link design variable $L_{r,(i,j)}$ is defined.

constraint conditions device selection constraint: the number of devices selected at the site m is one or less.

$$\sum_k Z_{m,k} \leq 1 \quad \forall m \quad (12)$$

line type constraint: the number of line types r selected on a link, into/from which traffic flows, between the sites (i,j) is one.

$$\sum_r L_{r,(i,j)} = 1 \quad \forall (i, j) \quad (13)$$

device port number constraint: the number of ports used for a traffic transfer should be equal to or smaller than the number of ports included in each device.

$$\sum_{j \neq m} U_r(\max[R_{mj}, R_{jm}]) L_{r,(m,j)} \leq \sum_k p_{r,k} Z_{m,k} - E_{r,m} \quad (14)$$

$\forall r, m$ where $R_{ij}$:
is the volume of traffic transferred on the (i→j) link.

$$U_r(): U_r(a) = \text{ceil}\left(\frac{a}{\text{LinkRateperPort}}\right)$$

is a function to calculate the number of ports used for the line type r by using a link traffic volume having a larger transfer volume of links in both directions. The function ceil(x) is as described above.

$p_{r,k}$:
is the number of ports of the line type r included in the device k.

$E_{r,m}$:
is the number of ports of the line type r used as Source/Destination of traffic at the site m.

link aggregation number constraint: limits the number of ports multiplexed for each link to a specified value or less.

$$\sum_r U_r(\max[R_{ij}, R_{ji}]) L_{r,(i,j)} \leq LA_{r,(i,j)} \quad \forall (i, j) \in E \quad (15)$$

where $LA_{r,(i,j)}$:
is the number of ports, which can be multiplexed, of the line type r for the link between the sites (i,j).

The problem set with the above described design method is summarized below. Definitions of the formulas and the variables are summarized in FIG. 21.

$$\text{Minimize} \sum_m \sum_k (C_{m,k} * Z_{m,k}) + \sum_r \sum_{ij} (\delta_r * L_{r,(i,j)}) \quad (11)$$

subject to $$\sum_k Z_{m,k} \leq 1 \quad \forall m \quad (12)$$

$$\sum_r L_{r,(i,j)} = 1 \quad \forall (i, j) \quad (13)$$

$$\sum_{j \neq m} U_r(\max[R_{mj}, R_{jm}]) L_{r,(m,j)} \leq \sum_k p_{r,k} Z_{m,k} \quad \forall r, m \quad (14)$$

$$\sum_r U_r(\max[R_{ij}, R_{ji}]) L_{r,(i,j)} \leq LA_{i,j} \quad \forall (i, j) \in E \quad (15)$$

Design Example

Figure 20:
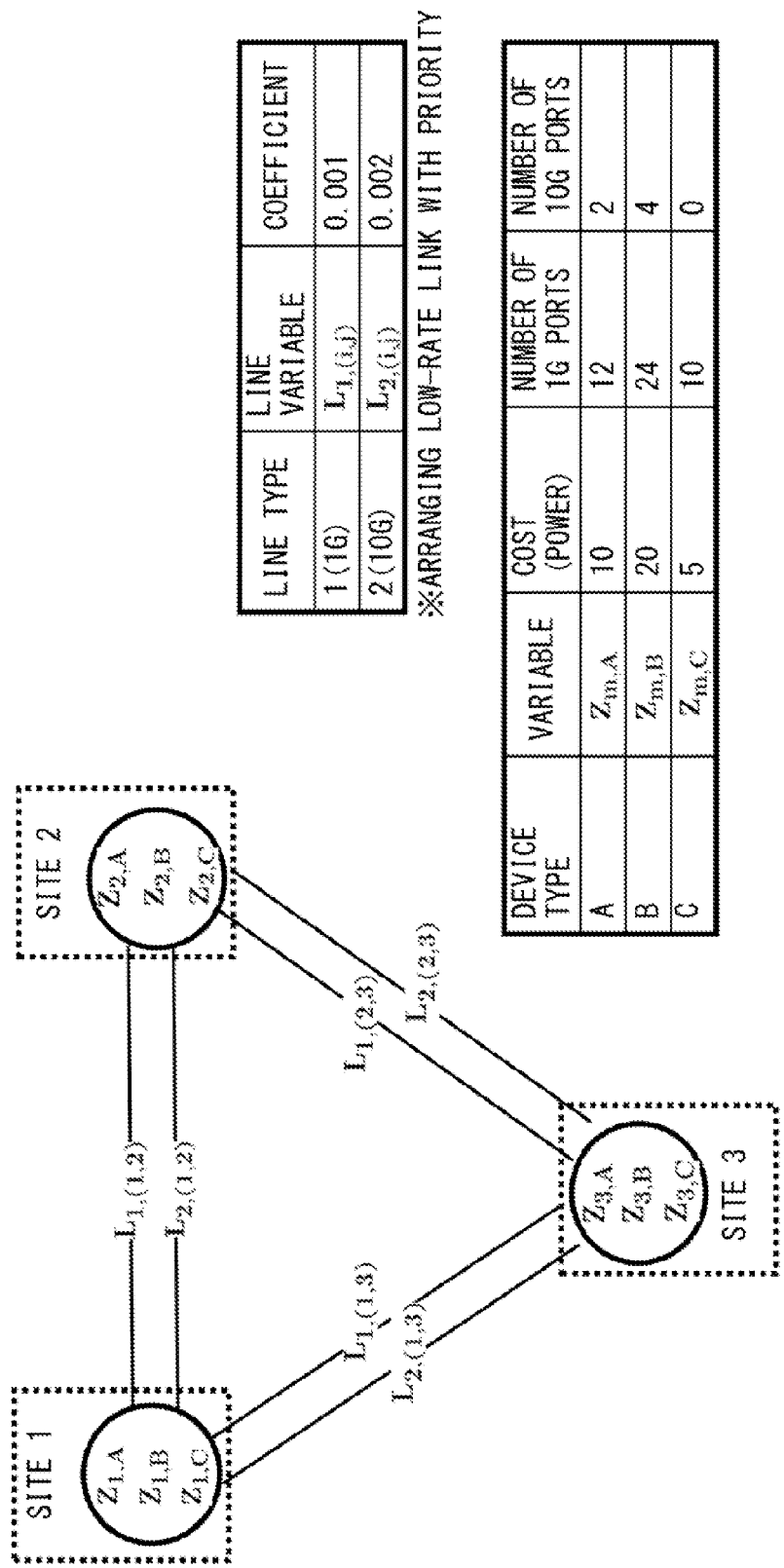
FIG. 20 is an explanatory view (No. 2) of the line/device design method when the traffic state is explicitly given.
Figure 22:
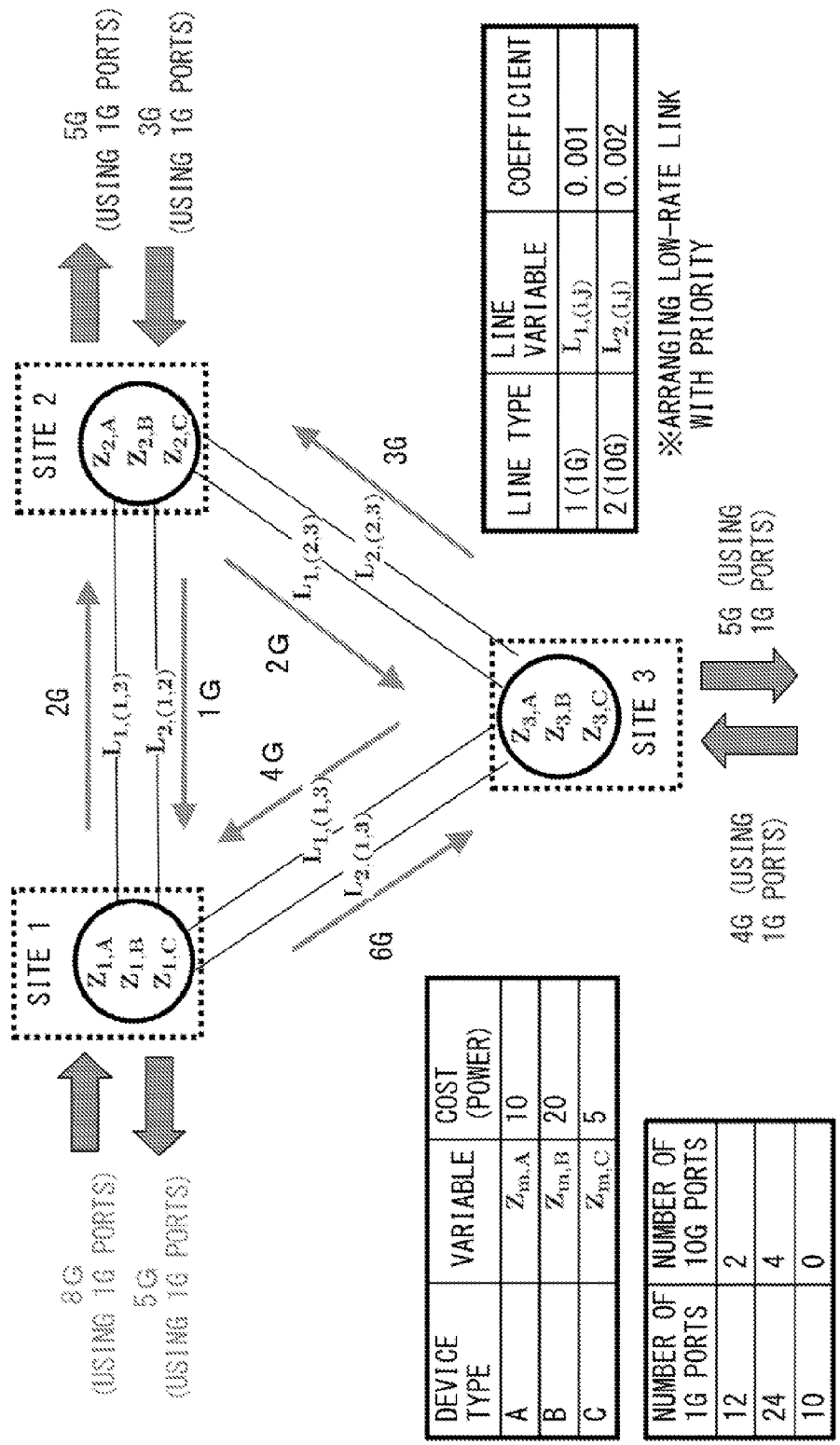
FIG. 22 is an explanatory view (No. 4) of the line/device design method when the traffic state is explicitly given.

A 0-1 integer programming problem when a traffic state illustrated in FIG. 22 is given to a design problem illustrated in FIG. 20 is described below.

Here, assume that there are three types (A, B and C) of device candidates, which can be arranged at each site. Also assume that two types such as a 1 G line (line type r=1) and a 10 G line (r=2) are used as line types and a link aggregation is not performed ($LA_{r,(i,j)}=1$).

1. Design Model

Minimize $10Z_{1,A} + 20Z_{1,B} + 5Z_{1,C} + 10Z_{2,A} + 20Z_{2,B} +$ $5Z_{2,C} + 10Z_{3,A} + 20Z_{3,B} + 5Z_{3,C} + 0.001L_{1,(1,2)} +$ $0.001L_{1,(1,3)} 0.001L_{1,(2,3)} + 0.002L_{2,(1,2)} + 0.002L_{2,(1,3)} + 0.002L_{2,(2,3)}$ subject to $Z_{1,A} + Z_{1,B} + Z_{1,C} \leq 1$ $Z_{2,A} + Z_{2,B} + Z_{2,C} \leq 1$ $Z_{3,A} + Z_{3,B} + Z_{3,C} \leq 1$ $L_{1,(1,2)} + L_{2,(1,2)} = 1$ $L_{1,(1,3)} + L_{2,(1,3)} = 1$ $L_{1,(2,3)} + L_{2,(2,3)} = 1$ $U_1(2)L_{1,(1,2)} + U_1(6)L_{1,(1,3)} \leq 12Z_{1,A} + 24Z_{1,B} + 10Z_{1,C} - 13$ $U_2(2)L_{2,(1,2)} + U_2(6)L_{2,(1,3)} \leq 2Z_{1,A} + 4Z_{1,B} + 0Z_{1,C}$ $U_1(2)L_{1,(1,2)} + U_1(3)L_{1,(2,3)} \leq 12Z_{2,A} + 24Z_{2,B} + 10_{2,C} - 8$ $U_2(2)L_{2,(1,2)} + U_2(3)L_{2,(2,3)} \leq 2Z_{2,A} + 4Z_{2,B} + 0Z_{2,C}$ $U_1(6)L_{1,(1,3)} + U_1(3)L_{1,(2,3)} \leq 12Z_{3,A} + 24Z_{3,B} + 10Z_{3,C} - 9$ $U_2(6)L_{2,(1,3)} + U_2(3)L_{2,(2,3)} \leq 2Z_{3,A} + 4Z_{3,B} + 0Z_{3,C}$ $U_1(2)L_{1,(12)} + U_2(2)L_{2,(12)} \leq 1$ $U_1(6)L_{1,(13)} + U_2(6)L_{2,(13)} \leq 1$ $U_1(3)L_{1,(23)} + U_2(3)L_{2,(23)} \leq 1$ where $U_1( )$ is a function to obtain the number of ports by assuming the 1 G line, and $U_2( )$ is a function to obtain the number of ports by assuming the 10 G line. Accordingly, for example, coefficients $U_1(6)=6$, $U_2(6)=1$ are obtained.

2. Design Solution

A computation using the solver results in "$L_{2,(1,2)}=1$, $L_{2,(1,3)}=1$, $L_{2,(2,3)}=1$, $Z_{1,B}=1$, $Z_{2,A}=1$, $Z_{3,A}=1$, the other design variables=0". Namely, the device B is selected for the site 1, the device A is selected for the sites 2 and 3, and all lines between the sites are 10 G.

3. Example of a Data Structure when R (lp_solve) is Applied

FIG. 23 illustrates an image of a data structure when the above described model is applied to R (lp_solve). Output data illustrated in FIG. 23 indicates that an output of "$Z_{1,B}$, $Z_{2,A}$, $Z_{3,A}$, $L_{2,(1,2)}$, $L_{2,(1,3)}$ and $L_{2,(2,3)}$ are 1, the other design variables are 0" is obtained.

In the objective function of the above described design model, a mathematical computation is performed by giving a coefficient of a small value $\delta_r(=0.001, 0.002)$ to link design variables ($X_{r,(i,j)}$ and $L_{r,(i,j)}$). However, a value such as the amount of money or the like needed to set a link between sites may be added as this coefficient. For example, if a cost needed to set a line from the site 1 to the site 2 is 1000, a coefficient of the corresponding link may be set to $(1000+\delta_r)X_{r,(1,2)}$, $(1000+\delta_r)X_{r,(2,1)}$, or $(1000+\delta_r)L_{r,(1,2)}$.

Additionally, the condition that only one device should be arranged at each site is given in the above described design. However, a design can be made also under a condition that a plurality of devices can be arranged at each site when traffic is accommodated.

If a design is made under such a condition, a design variable $Z_{m,k}$ of a device that can be arranged at the site m is not given as an integer value of 0 or 1 but defined as an integer value ($\epsilon Z$) that permits results of arranging a plurality of devices k, and a design model obtained by deleting a constraint formula (formula provided below) such as the following (3), (8), (12) or the like is calculated as an integer programming problem.

$$\sum_k Z_{m,k} \leq 1 \; \forall m$$

Additionally, the above described design refers to the example of setting the plurality of device candidates ($Z_{m,k}$: k=A, B, C) that can be arranged at each site m. However, if a design is made under a condition that one device candidate (example: k=A) is arranged at each site, a line/path design is made under a condition that one device is explicitly given to each site.

Figure 24:
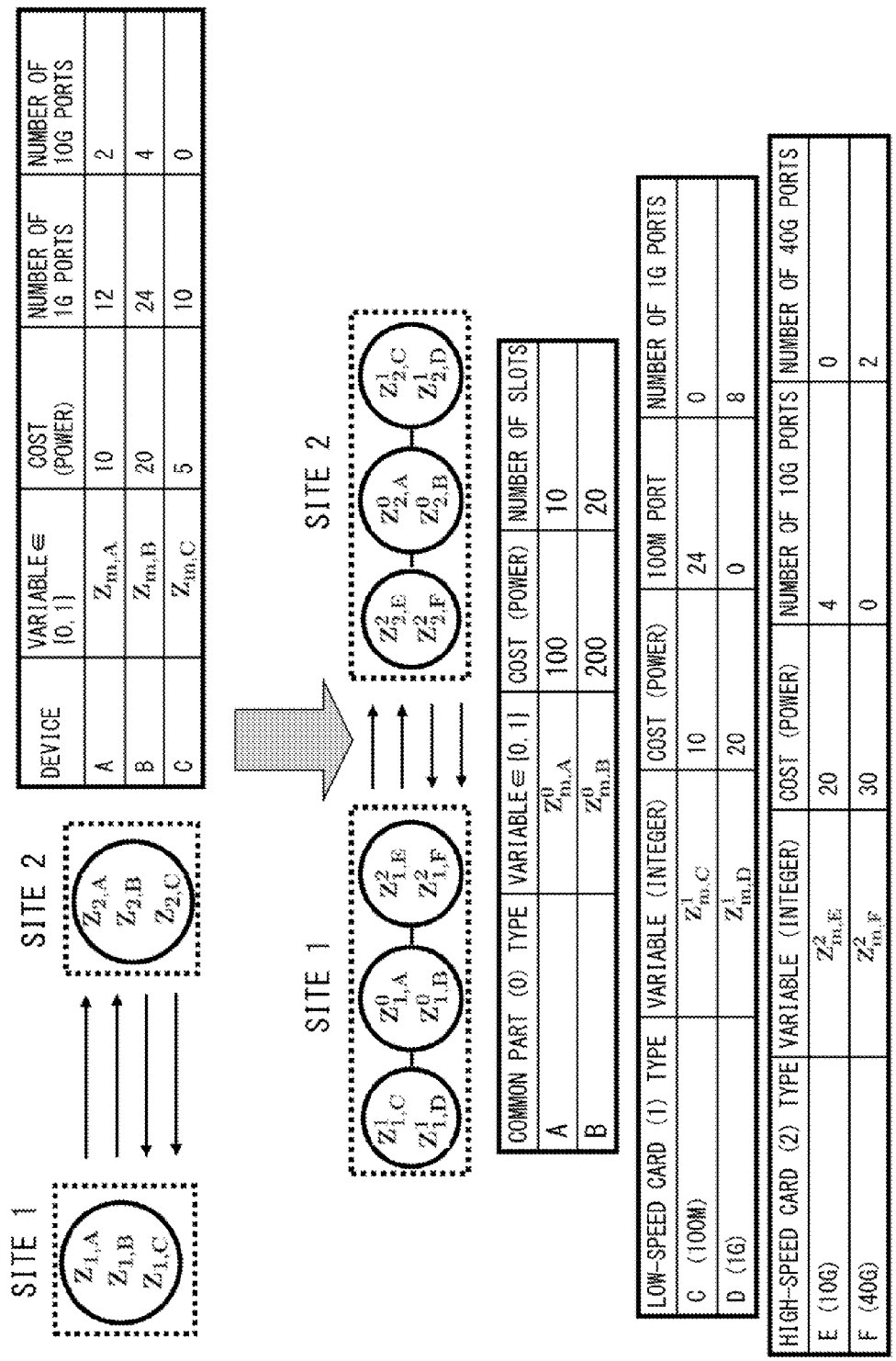
FIG. 24 is an explanatory view (No. 1) of a method implemented by applying a design method assuming a chassis type device to the method illustrated in FIGS. 13 and 14.
Figure 25:
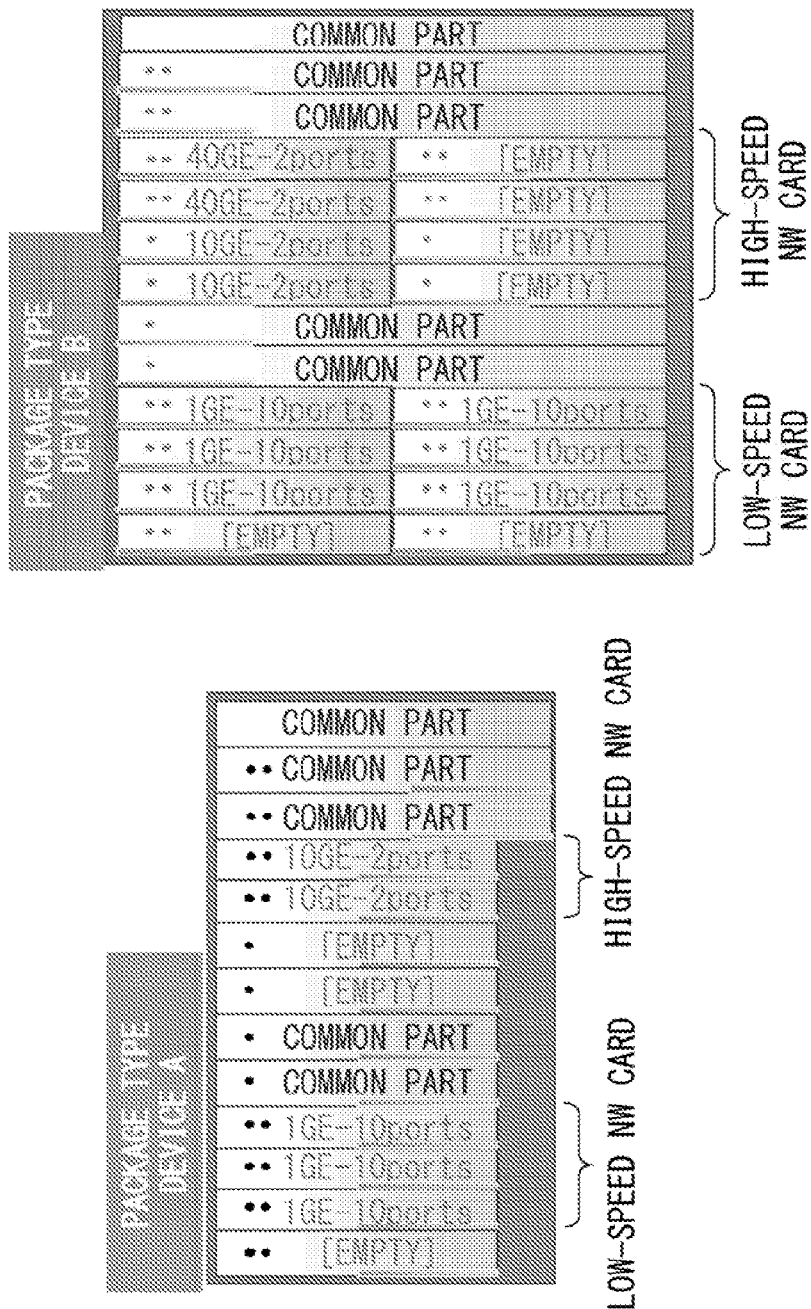
FIG. 25 is an explanatory view (No. 2) of the method implemented by applying a design method assuming a chassis type device to the method illustrated in FIGS. 13 and 14.

FIGS. 24 to 26 are explanatory views of a method implemented by applying a design method that assumes a chassis type device to the method illustrated in FIGS. 13 and 14.

The above described design assumes a network device of a box type where ports and housing are integrated into one body. However, some network devices is configured not with a box type but with one housing by combining separate packages such as a network IF, a switching fabric and the like. Accordingly, a method of designing a device package configuration that minimizes a cost (the amount of power consumption) while ensuring traffic to be accommodated by expanding the above described design model is described. Here, a package configuration is assumed to handle three types of device components, illustrated in FIG. 25, such as a low-speed NW (NetWork) card for processing traffic input/output to/from a network, a high-speed NW card for processing traffic relayed by a network, and a common part, which can include the NW cards as slots, for controlling a traffic process between cards. This problem can be solved as an integer programming program obtained by changing the design variables and by adding constraint conditions to the above defined design problems.

The structure itself of the problem does not significantly vary even when a package is designed to be expanded. Therefore, the following description refers to only portions changed in the objective function and the constraint conditions.

objective function change

Minimizes the cost (power) of a device package to be arranged in a network when a given traffic demand is accommodated. Assume that one device is configured with the components such as a common part (p=0), a low-speed NW card (p=1), and a high-speed NW card (p=2).

$$\text{Minimize} \left\{ \sum_m \sum_k \sum_p (C_{m,k}^p * Z_{m,k}^p) + \sum_{s,d} \sum_r \sum_{ij} \left( \delta_r * X_{r,(i,j)}^{(s,d)} \right) \right\} \quad (16)$$

where $C^P_{m,k}$:

is the cost (the amount of power consumption) of a card type k in a device component p that can be arranged at the site m.

Design variable change $$Z_{m,k}^p \begin{cases} \in \{0,1\} & p = 0 \quad \text{existence/absence of a common part } k \text{ at a site } m(\in V) \\ \in Z & p = 1, 2 \quad \text{mounting number of NW cards } k \text{ at a site } m(\in V) \end{cases}$$

constraint condition change
"Expansion change of the formula (3)"
package selection constraint: the number of common parts (p=0) selected for the site m is one or less.

$$\sum_k Z_{m,k}^0 \leq 1 \quad \forall m \qquad (17)$$

"new additions"
slot number constraint of the common part (p=0): the number of NW cards that can be included within a device should be equal to or smaller than the number of slots possessed by each common part.

$$\sum_k (Z_{m,k}^1 + Z_{m,k}^2) \leq \sum_k s_{m,k} Z_{m,k}^0 \quad \forall m \qquad (18)$$

where
$s_{m,k}$:
is the number of slots included in the common part k that can be arranged at the site m.
"expansion in consideration of a low-speed NW card in the formula (4)"
port number constraint of the low-speed NW card (p=1): the number of ports of the line type r used as Source/Destination of traffic should be equal to or smaller than the number of ports mounted on the low-speed NW card k.

$$E_{r,m} \leq \sum_k p_{r,k} Z_{m,k}^1 \quad \forall r, m \qquad (19)$$

where
$p_{r,k}$:
indicates the number of ports of the line type r mounted on the low-speed NW card (k).
$E_{r,m}$:
indicates the number of ports of the line type r used as Source/Destination of traffic at the site m.
"Expansion in consideration of the high-speed NW card in the formula (4)"
port number constraint of the high-speed NW card (p=2)

$$\sum_j U_r \left( \max \left[ \sum_{(s,d)} B^{(s,d)} X_{r,(mj)}^{(s,d)}, \sum_{(s,d)} B^{(s,d)} X_{r,(jm)}^{(s,d)} \right] \right) \leq \sum_k p_{r,k} Z_{m,k}^2 \qquad (20)$$

$\forall r, m$

The problem set with the above described method is summarized below. Definitions of the formulas and the variables are summarized in FIG. 26.

Minimize $$\sum_m \sum_k \sum_p (C_{m,k}^p * Z_{m,k}^p) + \sum_{s,d} \sum_r \sum_{ij} (\delta_r * X_{r,(i,j)}^{(s,d)}) \qquad (16)$$

subject to $$\sum_r \left( \sum_j X_{r,(ij)}^{(s,d)} - \sum_j X_{r,(ji)}^{(s,d)} \right) = \begin{cases} 1 & \forall (s,d), i = s \\ -1 & \forall (s,d), i = d \\ 0 & \forall (s,d), i \neq s, d \end{cases} \qquad (4)$$

$$\sum_r \sum_{ij} X_{r,(ij)}^{(s,d)} \leq H^{(s,d)} \quad \forall (s,d) \qquad (17)$$

$$\sum_k Z_{m,k}^0 \leq 1 \quad \forall m$$

$$\sum_k (Z_{m,k}^1 + Z_{m,k}^2) \leq \sum_k s_{m,k} Z_{m,k}^0 \quad \forall m \qquad (18)$$

$$E_{r,m} \leq \sum_k p_{r,k} Z_{m,k}^1 \quad \forall r, m \qquad (19)$$

$$\sum_j U_r \left( \max \left[ \sum_{(s,d)} B^{(s,d)} X_{r,(mj)}^{(s,d)}, \sum_{(s,d)} B^{(s,d)} X_{r,(jm)}^{(s,d)} \right] \right) \leq \sum_k p_{r,k} Z_{m,k}^2 \qquad (20)$$

$$\sum_r U_r \left( \max \left[ \sum_{(s,d)} B^{(s,d)} X_{r,(ij)}^{(s,d)}, \sum_{(s,d)} B^{(s,d)} X_{r,(ji)}^{(s,d)} \right] \right) \leq LA_{i,j} \qquad (5)$$

$\forall r, (i,j) \in E$

Figure 28:
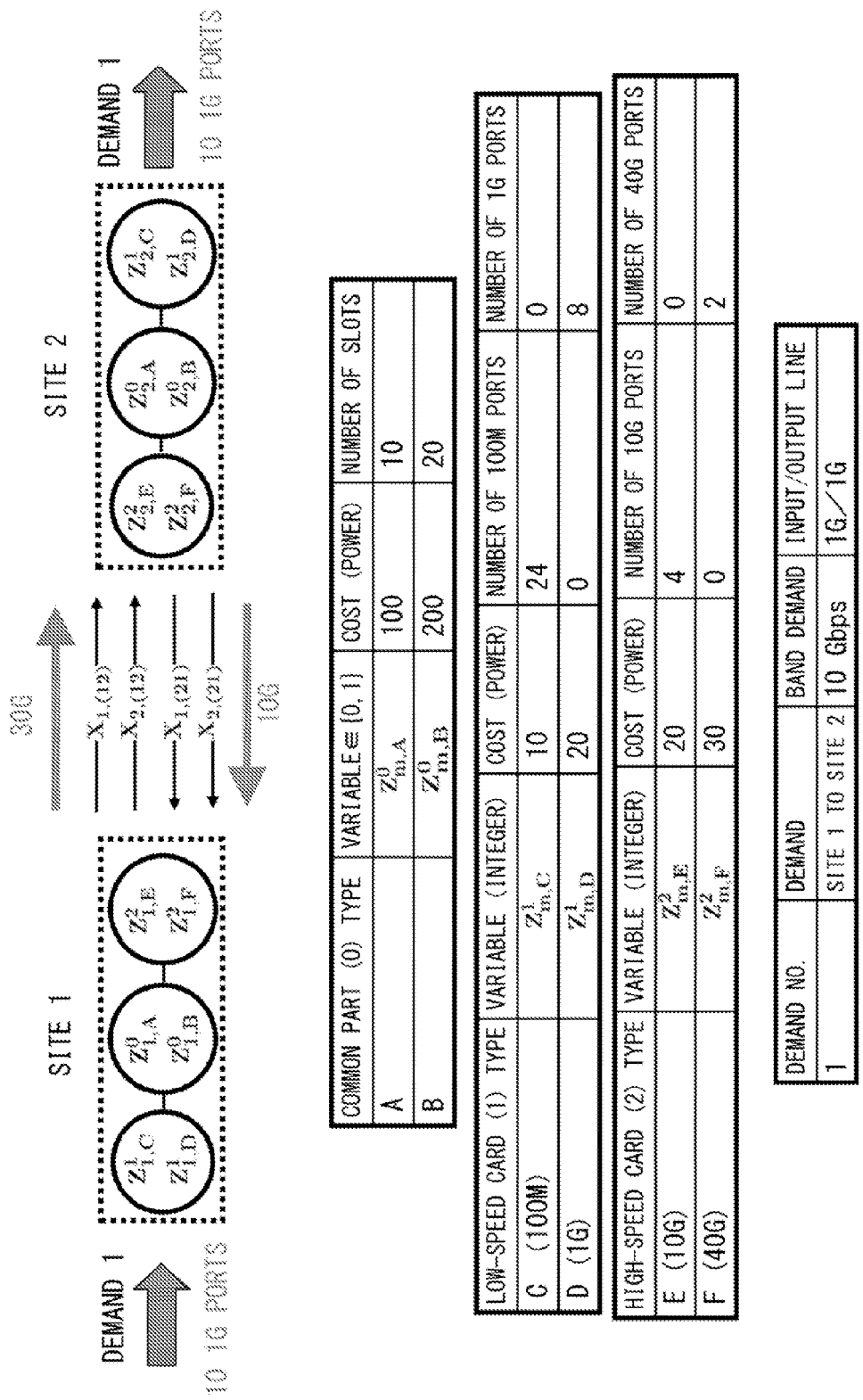
FIG. 28 is an explanatory view (No. 2) of the method implemented by applying a design method assuming a chassis type device to the method illustrated in FIGS. 15 to 18.

FIGS. 27 to 29 are explanatory views of a method implemented by applying a design method that assumes a chassis type device to the method illustrated in FIGS. 15 to 18.

This method handles a case where the method illustrated in FIGS. 24 to 26 is processed with an incremental approach.
objective function change
Minimizes the cost (the amount of power consumption) of a device package to be arranged in a network in order to ensure a given traffic transfer state to be accommodated. Assume that one device is configured with components such as a common part (p=0), a low-speed NW card (p=1), and a high-speed NW card (p=2).

$$\text{Minimize} \left\{ \sum_m \sum_k \sum_p (C_{m,k}^p * Z_{m,k}^p) + \sum_r \sum_{ij} (\delta_r * X_{r,(i,j)}) \right\} \qquad (21)$$

where
$C_{m,k}^p$:
is the cost (the amount of power consumption) of the card type k in the device component p that can be deployed at the site m.
design variable change $$Z_{m,k}^p \begin{cases} \in \{0,1\} & p = 0 \quad \text{existence/absence of a common part } k \text{ at a site } m(\in V) \\ \in Z & p = 1, 2 \quad \text{mounting number of NW cards } k \text{ at a site } m(\in V) \end{cases}$$

constraint condition change
"expansion change of the formula (8)"
package selection constraint: the number of common parts (p=0) selected at the site m is one or less.

$$\sum_k Z_{m,k}^p \le 1 \quad p=0, \forall m \quad (22)$$

"new additions"

slot number constraint of the common part: the number of NW cards that can be included in a device p=0 should be equal to or smaller than the number of slots possessed by each common part.

$$\sum_k (Z_{m,k}^1 + Z_{m,k}^2) \le \sum_k s_{m,k} Z_{m,k}^0 \quad \forall m \quad (23)$$

where $S_{m,k}$:

is the number of slots included in the common part k that can be arranged at the site m.

"Expansion in consideration of the low-speed NW card in the formula (9)".

port number constraint of the low-speed NW card (p=1): the number of ports of the line type r used as Source/Destination of traffic, should be equal to or smaller than the number of ports mounted on the low-speed NW card k.

$$E_{r,m} \le \sum_k p_{r,k} Z_{m,k}^1 \quad (24)$$

$\forall r, m$ where $p_{r,k}$:

indicates the number of ports of the line type r mounted on the low-speed NW card (k).

$E_{r,m}$:

indicates the number of ports of the line type r used as Source/Destination of traffic at the site m.

"expansion of the high-speed NW card in the formula (9)"

port number constraint of the high-speed NW card (p=2)

$$\sum_j \left\{ (U_r(\max[(B+R_{mj}), R_{jm}]) - u_{m,j}^r) X_{r,(mj)} - \sum_{q \ne r} \{u_{m,j}^r X_{q,(mj)}\} + \right.$$

$$(U_r(\max[(B+R_{jm}), R_{mj}]) - u_{j,m}^r) X_{r,(jm)} -$$

$$\left. \sum_{q \ne r} \{u_{j,m}^r X_{q,(jm)}\} + u_{m,j}^r \right\} \le \sum_k p_{r,k} Z_{m,k}^2 \quad (25)$$

$\forall r, m$

The problem set with the above described method is summarized below. Definitions of the formulas and the variables are summarized in FIG. 27.

$$\text{Minimize} \quad \sum_m \sum_k \sum_p (C_{m,k}^p * Z_{m,k}^p) + \sum_r \sum_{ij} (\delta_r * X_{r,(ij)}) \quad (21)$$

subject to $$\sum_r \left( \sum_j X_{r,(ij)} - \sum_j X_{r,(ji)} \right) = \begin{cases} 1 & \forall i = s \\ -1 & \forall i = d \\ 0 & \forall i \ne s, d \end{cases} \quad (9)$$

$$\sum_r \sum_{ij} X_{r,(i,j)} \le H$$

$$\sum_k Z_{m,k}^0 \le 1 \quad (22)$$

$\forall m$ $$\sum_k (Z_{m,k}^1 + Z_{m,k}^2) \le \sum_k s_{m,k} Z_{m,k}^0 \quad (23)$$

$\forall m$ $$E_{r,m} \le \sum_k p_{r,k} Z_{m,k}^1 \quad (24)$$

$\forall r, m$ $$\sum_j \left\{ (U_r(\max[(B+R_{mj}), R_{jm}]) - u_{m,j}^r) X_{r,(mj)} - \sum_{q \ne r} \{u_{m,j}^r X_{q,(mj)}\} + \right. \quad (25)$$

$$(U_r(\max[(B+R_{jm}), R_{mj}]) - u_{j,m}^r) X_{r,(jm)} -$$

$$\left. \sum_{q \ne r} \{u_{j,m}^r X_{q,(jm)}\} + u_{m,j}^r \right\} \le \sum_k p_{r,k} Z_{m,k}^2$$

$\forall r, m$ $$U_r(\max[B^r + R_{ij}, R_{ji}]) X_{r,(ij)} \le LA_{r,[i,j]} \quad (10)$$

$\forall \{(i, j)\} \in E$

Design Example

A route/device configuration and a line type are designed for the demand 1 by taking FIG. 28 as an example. Assume that two types such as a 10 G line (line type r=1) and a 40 G line (r=2) are used as lines between the sites 1 and 2 and a link aggregation is not performed ($LA_{r(1,2)}=1$). Also assume a state where 30-Gbps background traffic already occurs between the sites 1→2, and 10-Gbps background traffic already occurs between the sites 2→1.

1. Design Model

Minimize $100 Z_{1,A}^0 + 200 Z_{1,B}^0 + 10 Z_{1,C}^1 + 20 Z_{1,D}^1 + 20 Z_{1,E}^2 + 30 Z_{1,F}^2 +$ $\quad 100 Z_{2,A}^0 + 200 Z_{2,B}^0 + 10 Z_{2,C}^1 + 20 Z_{2,D}^1 + 20 Z_{2,E}^2 + 30 Z_{2,F}^2 +$ $\quad 0.001 X_{1,(12)} + 0.001 X_{1,(21)} + 0.002 X_{2,(12)} + 0.002 X_{2,(21)}$ subject to $X_{1,(12)} + X_{2,(12)} - X_{1,(21)} - X_{2,(21)} = 1$ $X_{1,(21)} + X_{2,(21)} - X_{1,(12)} - X_{2,(12)} = 1$ $Z_{1,A}^0 + Z_{1,B}^0 \le 1$ $Z_{2,A}^0 + Z_{2,B}^0 \le 1$ $Z_{1,C}^1 + Z_{1,D}^1 + Z_{1,E}^2 + Z_{1,F}^2 \le 10 Z_{1,A}^0 + 20 Z_{1,B}^0$ $Z_{2,C}^1 + Z_{2,D}^1 + Z_{2,E}^2 + Z_{2,F}^2 \le 10 Z_{2,A}^0 + 20 Z_{2,B}^0$ $10 \le 0 Z_{1,C}^1 + 8 Z_{1,D}^1$ $10 \le 0 Z_{2,C}^1 + 8 Z_{2,D}^1$ $((U_1(40) - U_1(30)) X_{1,(12)} - U_1(30) X_{2,(12)} +$ -continued $$((U_1(30) - U_1(30))X_{1,(21)} - U_1(30)X_{2,(21)}) + U_1(30) \leq 4Z^2_{1,E} + 0Z^2_{1,F}$$

$$((U_2(40) - U_2(30))X_{2,(12)} - U_2(30)X_{1,(12)}) +$$
$$((U_2(30) - U_2(30))X_{2,(21)} - U_2(30)X_{1,(21)}) + U_2(30) \leq 0Z^2_{1,E} + 2Z^2_{1,F}$$

$$((U_1(40) - U_1(30))X_{1,(12)} - U_1(30)X_{2,(12)}) +$$
$$((U_1(30) - U_1(30))X_{1,(21)} - U_1(30)X_{2,(21)}) + U_1(30) \leq 4Z^2_{2,E} + 0Z^2_{2,F}$$

$$((U_2(40) - U_2(3))X_{2,(12)} - U_2(30)X_{1,(12)}) +$$
$$((U_2(30) - U_2(30))X_{2,(21)} - U_2(30)X_{1,(21)}) + U_2(30) \leq 0Z^2_{2,E} + 2Z^2_{2,F}$$

$$U_1(40)X_{1,(12)} + U_2(40)X_{2,(12)} \leq 1$$

$$U_1(30)X_{1,(21)} + U_2(30)X_{2,(21)} \leq 1$$

where $U_1()$ is a function to obtain the number of ports by assuming the 10 G line, and $U_2()$ is a function to obtain the number of ports by assuming the 40 G line. Accordingly, for example, coefficients $U_1(40)=4$, $U_2(40)=1$ are obtained.

2. Design Solution to the Demand 1

A computation using the solver results in "$X_{2,(1,2)}=1$, $Z^0_{1,A}=1$, $Z^1_{1,D}=2$, $Z^2_{1,F}=1$, $Z^0_{2,A}=1$, $Z^1_{2,D}=2$, $Z^2_{2,F}=1$, the other design variables=0". Namely, two low-speed cards D, one high-speed card F and the common part A are selected for the sites 1 and 2, and a route via the 40 G line between the sites 1 and 2 is designed for the demand 1.

3. Example of a Data Structure when R (lp_solve) is Applied

FIG. 29 illustrates an image of a data structure when the above described model is applied to R(lp_solve). Output data of FIG. 29 indicates that an output of "$X_{2,(1,2)}=1$, $Z^0_{1,A}=1$, $Z^1_{1,D}=2$, $Z^2_{1,F}=1$, $Z^0_{2,A}=1$, $Z^1_{2,D}=2$, $Z^2_{2,F}=1$, the other design variables=0" is obtained.

Figure 31:
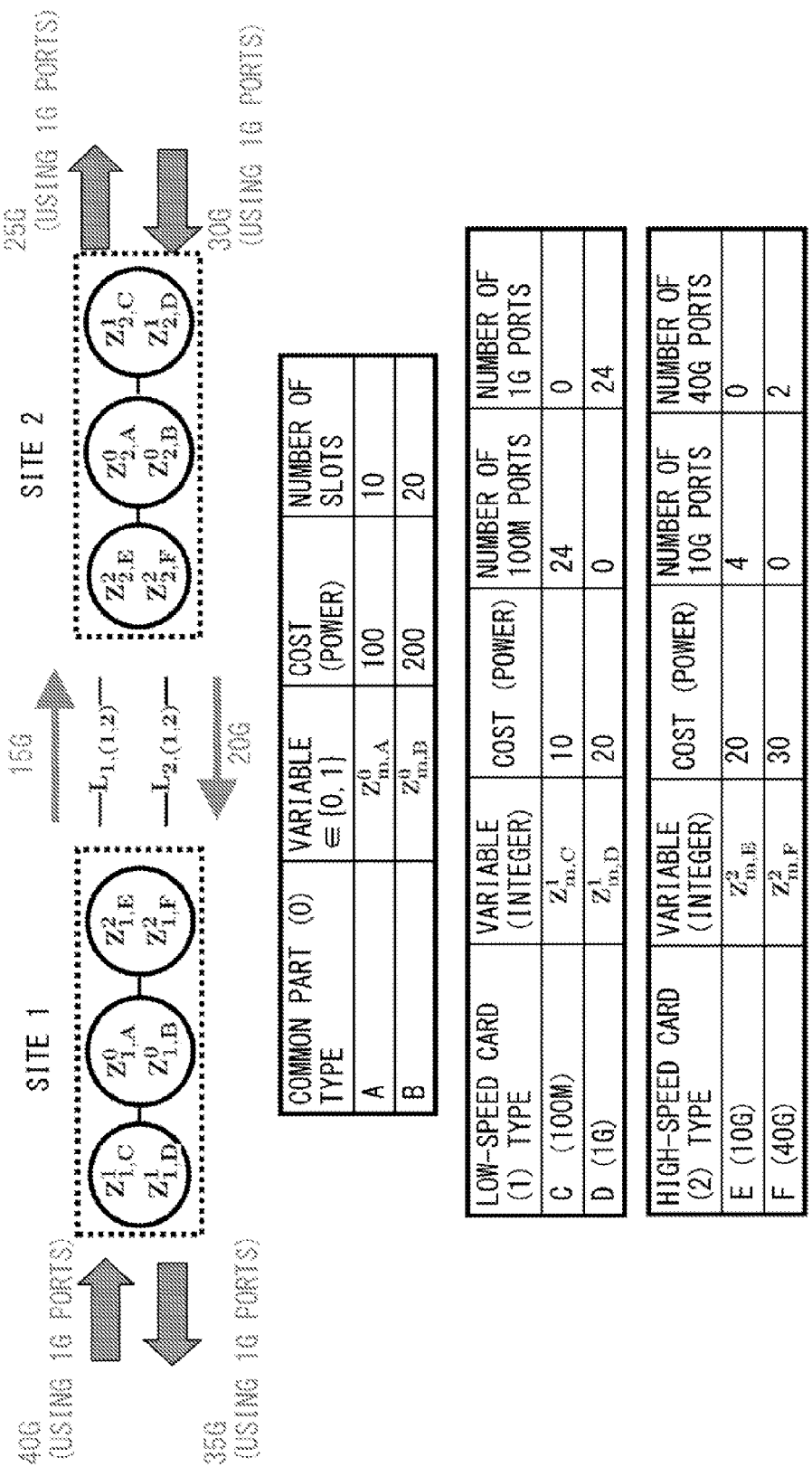
FIG. 31 is an explanatory view (No. 2) of the method implemented by applying a design method assuming a chassis type device to the method illustrated in FIGS. 19 to 23.

FIGS. 30 to 32 are explanatory views of a method implemented by applying a design method that assumes a chassis type device to the method illustrated in FIGS. 19 to 23.

objective function change

Minimizes the cost (the amount of power consumption) of a device package to be arranged in a network when a given traffic demand is accommodated. Assume that one device is configured with components such as a common part (p=0), a low-speed NW card (p=1), and a high-speed NW card (p=2).

$$\text{Minimize}\left\{\sum_m \sum_k \sum_p (C^p_{m,k} * Z^p_{m,k}) + \sum_r \sum_{ij} (\delta_r * L_{r,(i,j)})\right\} \quad (26)$$

where
$C^p_{m,k}$:
indicates the cost (the amount of power consumption) of the card type k in the device component p that can be arranged at the site m.

design variable change $Z^p_{m,k}$ $$\begin{cases} \in \{0, 1\} p = 0 \text{ existence/absence of a common part } k \text{ at a site } m (\in V) \\ \in Z \; p = 1, 2 \text{ mounting number of } NW \text{ cards } k \text{ at a site } m (\in V) \end{cases}$$

constraint condition changes

"expansion change of the formula (12)"
package selection constraint: the number of common parts (p=0) selected at the site m is one or less.

$$\sum_k Z^p_{m,k} \leq 1 \quad (27)$$

$p = 0, \forall m$

"new additions"
slot number constraint of the common part (p=0): the number of NW cards that can be included within a device should be equal to or smaller than the number of slots possessed by each common part.

$$\sum_k (Z^1_{m,k} + Z^2_{m,k}) \leq \sum_k s_{m,k} Z^0_{m,k} \quad (28)$$

$\forall m$ where
$s_{m,k}$:
indicates the number of slots included in the common part k that can be arranged at the site m.

"Expansion of the low-speed NW card in the formula (14)"
port number constraint of the low-speed NW card (p=1): the number of ports of the line type r used as Source/Destination of traffic, should be equal to or smaller than the number of ports mounted on the low-speed NW card k.

$$E_{r,m} \leq \sum_k p_{r,k} Z^1_{m,k} \quad (29)$$

$\forall r, m$ where
$p_{r,k}$:
indicates the number of ports of the line type r mounted on the low-speed NW card (k).
$E_{r,m}$:
indicates the number of ports of the line type r used as Source/Destination of traffic at the site m.

"Expansion of the high-speed NW card in the formula (14)"
port number constraint of the high-speed NW card (p=2)

$$\sum_{j \neq m} U_r(\max[R_{mj}, R_{jm}])L_{r,(m,j)} \leq \sum_k p_{r,k} Z^2_{m,k} \quad (30)$$

$\forall r, m$

The problem set with the above described method is summarized below. Definitions of the formulas and the variables are summarized in FIG. 26.

Minimize $$\sum_m \sum_k \sum_p (C^p_{m,k} * Z^p_{m,k}) + \sum_r \sum_{ij} (\delta_r * L_{r,(ij)}) \quad (26)$$

subject to $$\sum_k Z^0_{m,k} \leq 1 \quad (27)$$

$\forall m$

-continued $$\sum_r L_{r,(i,j)} = 1 \quad (13)$$

$$\forall (i, j)$$

$$\sum_k (Z^1_{m,k} + Z^2_{m,k}) \le \sum_k s_{m,k} Z^0_{m,k} \quad (28)$$

$$\forall m$$

$$E_{r,m} \le \sum_k p_{r,k} Z^1_{m,k} \quad (29)$$

$$\forall r, m$$

$$\sum_{j \ne m} U_r(\max[R_{mj}, R_{jm}]) L_{r,(m,j)} \le \sum_k p_{r,k} Z^2_{m,k} \quad (30)$$

$$\forall r, m$$

$$\sum_r U_r(\max[R_{ij}, R_{ji}]) L_{r,(i,j)} \le LA_{r,\{i,j\}} \quad (15)$$

$$\forall (i, j) \in E$$

Design Example

A device configuration and a line type are designed based on a given traffic state by taking FIG. 31 as an example. Assume that two types such as a 10 G line (line type r=1) and a 40 G line (r=2) are used as lines between the sites 1 and 2 and a link aggregation is not performed ($LA_{r,(1,2)}=1$). Also assume a state where 15-Gbps traffic occurs between the sites 1→2 and 20-Gbps traffic occurs between the sites 2→1.

1. Design Model

Minimize
$100Z^0_{1,A} + 200Z^0_{1,B} + 10Z^1_{1,C} + 20Z^1_{1,D} +$
$\quad 20Z^2_{1,E} + 30Z^2_{1,F} + 100Z^0_{2,A} + 200Z^0_{2,B} + 10Z^1_{2,C} +$
$\quad 20Z^1_{2,D} + 20Z^2_{2,E} + 30Z^2_{2,F} + 0.001L_{1,(1,2)} + 0.002L_{2,(1,2)}$ subject to $Z^0_{1,A} + Z^0_{1,B} \le 1$ $Z^0_{2,A} + Z^0_{2,B} \le 1$ $L_{1,(1,2)} + L_{2,(1,2)} = 1$ $Z^1_{1,C} + Z^1_{1,D} + Z^2_{1,E} + Z^2_{1,F} \le 10Z^0_{1,A} + 20Z^0_{1,B}$ $Z^1_{2,C} + Z^1_{2,D} + Z^2_{2,E} + Z^2_{2,F} \le 10Z^0_{2,A} + 20Z^0_{2,B}$ $75 \le 0Z^1_{1,C} + 24Z^1_{1,D}$ $55 \le 0Z^1_{2,C} + 24Z^1_{2,D}$ $U_1(20)L_{1,(1,2)} \le 4Z^2_{1,E} + 0Z^2_{1,E}$ $U_2(20)L_{2,(1,2)} \le 0Z^2_{1,E} + 2Z^2_{1,E}$ $U_1(20)L_{1,(1,2)} \le 4Z^2_{2,E} + 0Z^2_{2,E}$ $U_2(20)L_{2,(1,2)} \le 0Z^2_{2,E} + 2Z^2_{2,E}$ $U_1(20)L_{1,(1,2)} + U_2(20)L_{2,(1,2)} \le 1$ 2. Design Solution A computation using the solver results in "$L_{2(1,2)}=1$, $Z^0_{1,A}=1$, $Z^1_{1,D}=4$, $Z^2_{1,F}=1$, $Z^0_{2,A}=1$, $Z^1_{2,D}=3$, $Z^2_{2,F}=1$, the other design variables=0". Namely, four low-speed NW cards D and one high-speed NW card F are selected for the site 1, three low-speed NW cards D, one high-speed card F and a common part A are selected for the site 2, and a route via the 40 G line between the sites 1 and 2 is designed for the demand 1.

3. Example of a Data Structure when R (lp_solve) is Applied

FIG. 32 illustrates an image of a data structure when the above described model is applied to R(lp_solve). Output data illustrated in FIG. 32 indicates that an output of "$L_{2,(1,2)}=1$, $Z^0_{1,A}=1$, $Z^1_{1,D}=4$, $Z^2_{1,F}=1$, $Z^0_{2,A}=1$, $Z^1_{2,D}=3$, $Z^2_{2,F}=1$, the other design variables=0" is obtained.

Figure 33:
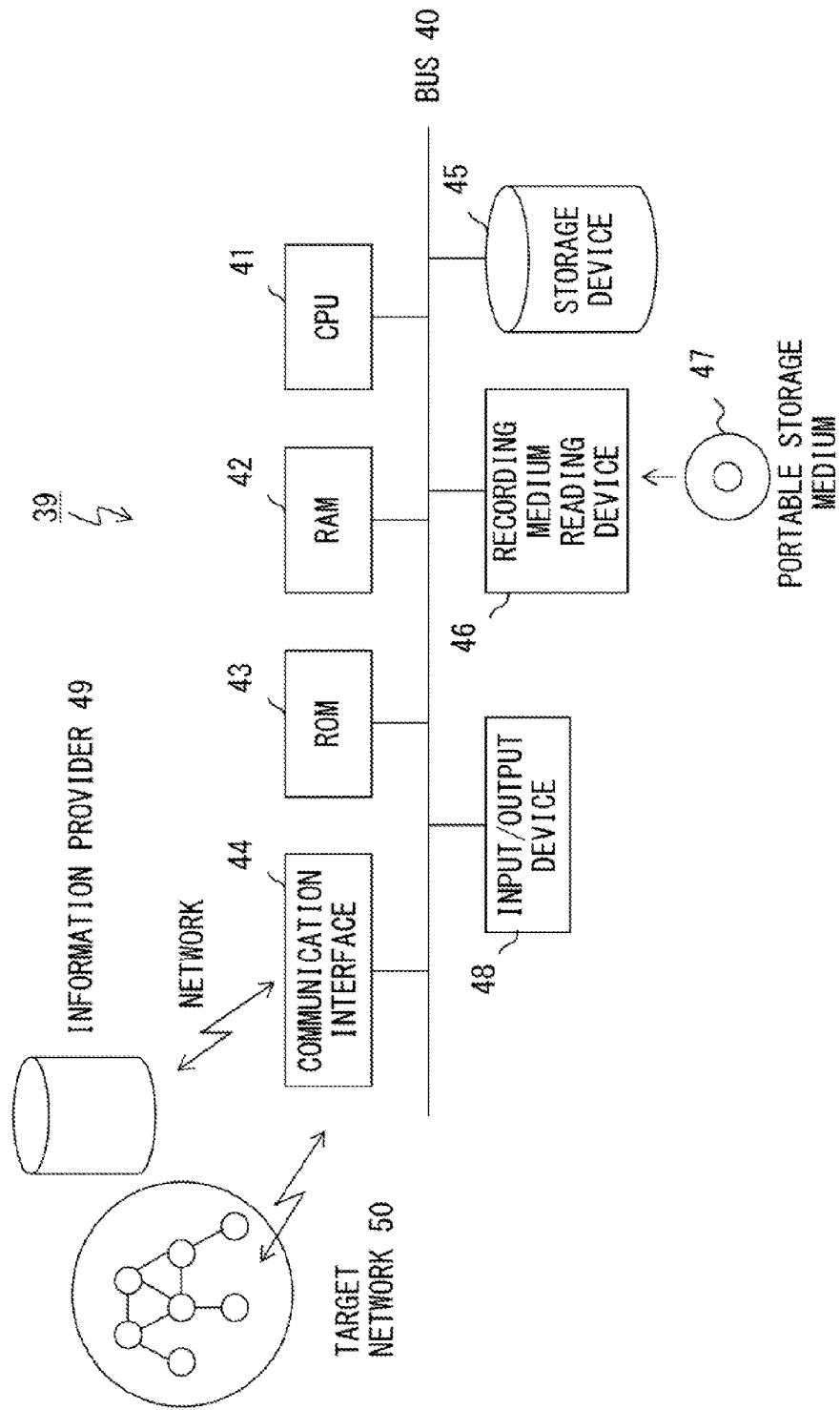
FIG. 33 illustrates an example of a hardware configuration of a computer needed when the design method according to the embodiment is executed with a program.

FIG. 33 illustrates an example of a hardware configuration of a computer needed when the design method according to this embodiment is executed with a program.

The design method according to this embodiment can be executed with the program. The computer 39 that executes the program may be a standalone machine, or a network device, connected to a target network 50 via a communication interface 44, for automatically setting a network device of the target network 50.

The computer 39 includes a CPU 41 that executes the program. The computer 39 also includes a storage device 45 such as a hard disk or the like for storing the program, a RAM 42 as a working area used to expand and execute the program, a ROM 43 for storing a program that controls basic functions of the computer 39, an input/output device 48 such as a keyboard, a display, a mouse and the like, and a communication interface 44 for making an external communication. Moreover, a recording medium reading device 46 reads a program from a portable storage medium 47, such as a DVD, a CD, a flexible disc, an IC memory or the like, for storing the program. These components are interconnected by a bus 40.

The program for executing the method according to this embodiment is stored in the storage device 45 or recorded on the portable recording medium 47. When being executed, the program is read from the storage device 45 or the portable recording medium 47, and expanded and executed in the RAM 42.

A user generates a design model when executing the design method according to this embodiment, and configures the design model as input data to a solver given as a program. The input data is input from the input/output device 48, the CPU is caused to execute the program, and a display unit or the like is caused to display design results. Consequently, the user can learn how to configure a network based on the display of the display unit.

The program can be downloaded and executed from a database possessed by an information provider 49 at a different site via a network connected to the communication interface 44, or can be executed in a network environment.

If the computer 39 is a network management device connected to the network 50 to be designed via the communication interface 44, data needed to configure a design model for executing the program can be collected from the target network. Furthermore, design contents may be automatically reflected on the target network 50 by transmitting design information obtained after the program is executed from the communication interface 44 to the target network 50 as a command.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A network design apparatus for setting a path and a device configuration, which are demanded for a network, to a device in the network, the network design apparatus comprising:
a processor which executes a process including:
obtaining information of a band of a path demanded between a starting site and an end site of the demanded path, a type of a device candidate that can be arranged at each site, and information of a type of a port and an upper limit of the number of ports in each device;
setting an objective function that indicates a device cost, and a constraint condition to be considered when the objective function is minimized by using the information of the band, the type of the device candidate, and the information of the type of a port and the upper limit of the number of ports in each device;
deriving a way to arrange a path, a way to arrange a device, a type of a used port and a number of ports by obtaining a solution to a mathematical programming problem for minimizing the objective function under the constraint condition; and
setting the path and a device configuration to the device in the network based on the way to arrange the path, the way to arrange the device, the type of the used port, and the number of ports, wherein
the device includes one or more first network cards which processes traffic input to or output from the network, one or more second network cards which processes traffic relayed by the network, and a common part which includes slots for mounting the one or more first network cards and the one or more second network cards and which controls a traffic process between cards, and
the constraint condition includes that the number of ports used for a traffic transfer in the each device is equal to or smaller than the upper limit of the number of ports in the each device, a number of links used for the traffic transfer is equal to or smaller than a first specified number, a number of common parts selected for each site is one or less, a total number of the one or more first network cards and the one or more second network cards that can be included within each device is equal to or smaller than a number of slots possessed by each common part, a number of ports of a line used as source or destination of traffic in the each device is equal to or smaller than a number of ports mounted on the one or more first network cards in the each device, a number of ports multiplexed for each link in the each device is equal to or smaller than a number of ports mounted on the one or more second network cards in the each device, and the number of ports multiplexed for each link in the each device is equal to or smaller than a second specified number.

2. The network design apparatus according to claim 1, wherein the path, the device and the number of ports are derived so that a device cost for adding a newly demanded path is minimized when the newly demanded path is sequentially added to the network where a preexisting path is already arranged.

3. The network design apparatus according to claim 1, wherein
a path to be arranged is predetermined, and the way to arrange the device, which minimizes the device cost, is derived.

4. The network design apparatus according to claim 1, wherein
a cost needed to arrange the path is included in the device cost.

5. The network design apparatus according to claim 4, wherein
a device to be used is predetermined, and the way to arrange the path and the number of used ports are derived.

6. The network design apparatus according to claim 1, wherein
a way to allocate traffic is predetermined, and the way to arrange the device, the type of the used port and the number of ports are derived.

7. The network design apparatus according to claim 1, wherein
when a network card having a port of a different type can be mounted in the device, a way to arrange the network card is derived instead of the way to arrange a device.

8. A network design method of setting a path and a device configuration, which are demanded for a network, to a device in the network, by using a computer, the network design method comprising:
obtaining, with a processor, information of a band of a path demanded between a starting site and an end site of the demanded path, a type of a device candidate that can be arranged at each site, and information of an upper limit of the number of ports in each device;
deriving, with the processor, a way to arrange a path, a way to arrange a device, a type of a used port, and a number of ports by obtaining a solution to a mathematical programming problem for minimizing an objective function under a constraint condition with use of the information of the band, the type of the device candidate, and the information of an upper limit of the number of ports in each device, the mathematical programming problem including the objective function that indicates a device cost, and the constraint condition to be considered when the objective function is minimized; and
setting, with the processor, the path and a device configuration to the device in the network based on the way to arrange the path, the way to arrange the device, the type of the used port, and the number of ports, wherein
the device includes one or more first network cards which processes traffic input to or output from the network, one or more second network cards which processes traffic relayed by the network, and a common part which includes slots for mounting the one or more first network cards and the one or more second network cards, and which controls a traffic process between cards, and
the constraint condition includes that the number of ports used for a traffic transfer in the each device is equal to or smaller than the upper limit of the number of ports in the each device, a number of links used for the traffic transfer is equal to or smaller than a first specified number, a number of common parts selected for each site is one or less, total number of the one or more first network cards and the one or more second network cards that can be included within each device is equal to or smaller than a number of slots possessed by each common part, a number of ports of a line used as source or destination of traffic in the each device is equal to or smaller than a number of ports mounted on the one or more first network cards in the each device, a number of ports multiplexed for each link in the each device is equal to or smaller than a number of ports mounted on the one or more second network cards in the each device, and the number of ports multiplexed for each link in the each device is equal to or smaller than a second specified number.

9. A non-transitory recording medium having stored therein a program for causing a computer to execute a network design process of setting a path and a device configuration, which are demanded for a network, to a device in the network, the network design process comprising:

obtaining information of a band of a path demanded between a starting site and an end site of the demanded path, a type of a device candidate that can be arranged at each site, and information of an upper limit of the number of ports in each device;

deriving a way to arrange a path, a way to arrange a device, a type of a used port, and a number of ports by obtaining a solution to a mathematical programming problem for minimizing an objective function under a constraint condition with use of the information of the band, the type of the device candidate, and the information of an upper limit of the number of ports in each device, the mathematical programming problem including the objective function that indicates a device cost, and the constraint condition to be considered when the objective function is minimized; and setting the path and a device configuration to the device in the network based on the way to arrange the path, the way to arrange the device, the type of the used port, and the number of ports, wherein the device includes one or more first network cards which processes traffic input to or output from the network, one or more second network cards which processes traffic relayed by the network, and a common part which includes slots for mounting the one or more first network cards and the one or more second network cards, and which controls a traffic process between cards, and the constraint condition includes that the number of ports used for a traffic transfer in the each device is equal to or smaller than the upper limit of the number of ports in the each device, a number of links used for the traffic transfer is equal to or smaller than a first specified number, a number of common parts selected for each site is one or less, total number of the one or more first network cards and the one or more second network cards that can be included within each device is equal to or smaller than a number of slots possessed by each common part, a number of ports of a line used as source or destination of traffic in the each device is equal to or smaller than a number of ports mounted on the one or more first network cards in the each device, a number of ports multiplexed for each link in the each device is equal to or smaller than a number of ports mounted on the one or more second network cards in the each device, and the number of ports multiplexed for each link in the each device is equal to or smaller than a second specified number.

* * * * *